US011816336B2

(12) United States Patent
Okada et al.

(10) Patent No.: US 11,816,336 B2

(45) **Date of Patent: *Nov. 14, 2023**

(54) STORAGE SYSTEM AND CONTROL METHOD THEREOF

(71) Applicant: Hitachi, Ltd., Tokyo (JP)

(72) Inventors: Naoya Okada, Tokyo (JP); Takashi Nagao, Tokyo (JP); Kentaro Shimada, Tokyo (JP); Ryosuke Tatsumi, Tokyo (JP); Sadahiro Sugimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,653

(22) Filed: Dec. 19, 2022

(65) Prior Publication Data

US 2023/0136735 A1 May 4, 2023

Related U.S. Application Data

(63) Continuation of application No. 17/693,718, filed on Mar. 14, 2022, now Pat. No. 11,543,972.

(30) Foreign Application Priority Data

Nov. 2, 2021 (JP) ................................ 2021-179216

(51) Int. Cl.
*G06F 3/06* (2006.01)

(52) U.S. Cl.
CPC .......... *G06F 3/0613* (2013.01); *G06F 3/0608* (2013.01); *G06F 3/0638* (2013.01); *G06F 3/0658* (2013.01); *G06F 3/0688* (2013.01)

(58) Field of Classification Search
CPC .... G06F 3/0613; G06F 3/0608; G06F 3/0638; G06F 3/0658; G06F 3/0665; G06F 3/0688

(Continued)

(56) References Cited

U.S. PATENT DOCUMENTS 5,630,092 A 5/1997 Carreiro et al.
9,116,858 B1 8/2015 Yokoi et al.

(Continued)

FOREIGN PATENT DOCUMENTS

WO 2015/181902 A1 12/2015
WO 2016/151831 A1 9/2016

OTHER PUBLICATIONS

Japanese Office Action received in corresponding Japanese Application No. 2021-179216 dated Aug. 15, 2023.

(Continued)

*Primary Examiner* — Hashem Farrokh

(74) *Attorney, Agent, or Firm* — MATTINGLY & MALUR, PC

(57) ABSTRACT

The present disclosure is to optimize processes in a storage system. A storage system includes: a first controller including a first computing device and a first memory; a second controller including a second computing device and a second memory; and an interface circuit that transfers data between the first controller and the second controller. The interface circuit reads first compressed data from the second memory. The interface circuit decompresses the first compressed data to generate first uncompressed data, and writes the first uncompressed data into the first memory.

8 Claims, 17 Drawing Sheets

(58) Field of Classification Search
USPC .......................................................... 711/154
See application file for complete search history.

(56) References Cited

U.S. PATENT DOCUMENTS

2018/0024958 A1 1/2018 Nachimuthu et al.
2018/0095674 A1* 4/2018 Alameldeen ............ G06F 3/064
2020/0004463 A1* 1/2020 Kobayashi ............ G06F 3/0646
2021/0216455 A1 7/2021 Uhrenholt et al.
2021/0216468 A1* 7/2021 Wu ..................... G06F 11/3034
2021/0397374 A1 12/2021 Agarwal

OTHER PUBLICATIONS

Hideyuki Koseki, et al. "Implementation of High Performance Data Compression Function for all flash arrays", Mar. 2016.

* cited by examiner

CPU
130B
132B
MULTIFUNCTIONAL I/F
DMAC
324B
COMPRESSION AND DECOMPRESSION COMPUTING UNIT
321B
SWITCH
322B
MEMORY
325B
MULTIFUNCTIONAL I/F
DMAC
324A
COMPRESSION AND DECOMPRESSION COMPUTING UNIT
321A
SWITCH
322A
MEMORY
325A
132A
CPU
130A

FIG. 7

COMMAND 530

| INSTRUCTION ITEM | INSTRUCTION CONTENT |
|---|---|
| COMMAND ID | 0x0000000000000001 |
| PROCESSING INSTRUCTION CONTENT | 0x0000000000000002 |
| TRANSFER SOURCE START ADDRESS | 0x0000000000000003 |
| TRANSFER DESTINATION START ADDRESS 0 | 0x0000000000000004 |
| TRANSFER DESTINATION START ADDRESS 1 | 0x0000000000000005 |
| TRANSFER LENGTH | 0x0000000000000006 |
| COMPRESSION ALGORITHM TYPE | 0x0000000000000007 |
| CHECK INSTRUCTION OF COMPRESSED DATA GUARANTEE CODE ID | 0x0000000000000008 |
| EXPECTED VALUE OF COMPRESSED DATA GUARANTEE CODE ID | 0x0000000000000009 |
| ASSIGNMENT INSTRUCTION OF DECOMPRESSED DATA GUARANTEE CODE ID | 0x000000000000000A |
| TYPE OF DECOMPRESSED DATA GUARANTEE CODE ID | 0x000000000000000B |
| ... | |

RESPONSE 550

| COMMAND ID | 0xFFFFFFF1 |
|---|---|
| STATUS | 0xFFFFFFF2 |
| ... | ... |

553, 554

130B
CPU
132B
MULTIFUNCTIONAL I/F
324B
DMAC
COMPRESSION AND DECOMPRESSION COMPUTING UNIT
321B
322B
SWITCH
MEMORY
325B
T101
132A
MULTIFUNCTIONAL I/F
324A
DMAC
COMPRESSION AND DECOMPRESSION COMPUTING UNIT
321A
322A
SWITCH
MEMORY
325A
CPU
130A

CPU
130A
MEMORY
S131A
MULTI-
FUNCTIONAL I/F
132A
MULTI-
FUNCTIONAL I/F
132B
MEMORY
131B
CPU
130B
S201
S202
S203
S204
S205
S206

CPU
130B
132B
MULTIFUNCTIONAL I/F
DMAC
324B
COMPRESSION AND DECOMPRESSION COMPUTING UNIT
321B
SWITCH
322B
MEMORY
325B
T101
DMAC
324A
COMPRESSION AND DECOMPRESSION COMPUTING UNIT
321A
SWITCH
322A
MEMORY
325A
MULTIFUNCTIONAL I/F
132A
CPU
130A

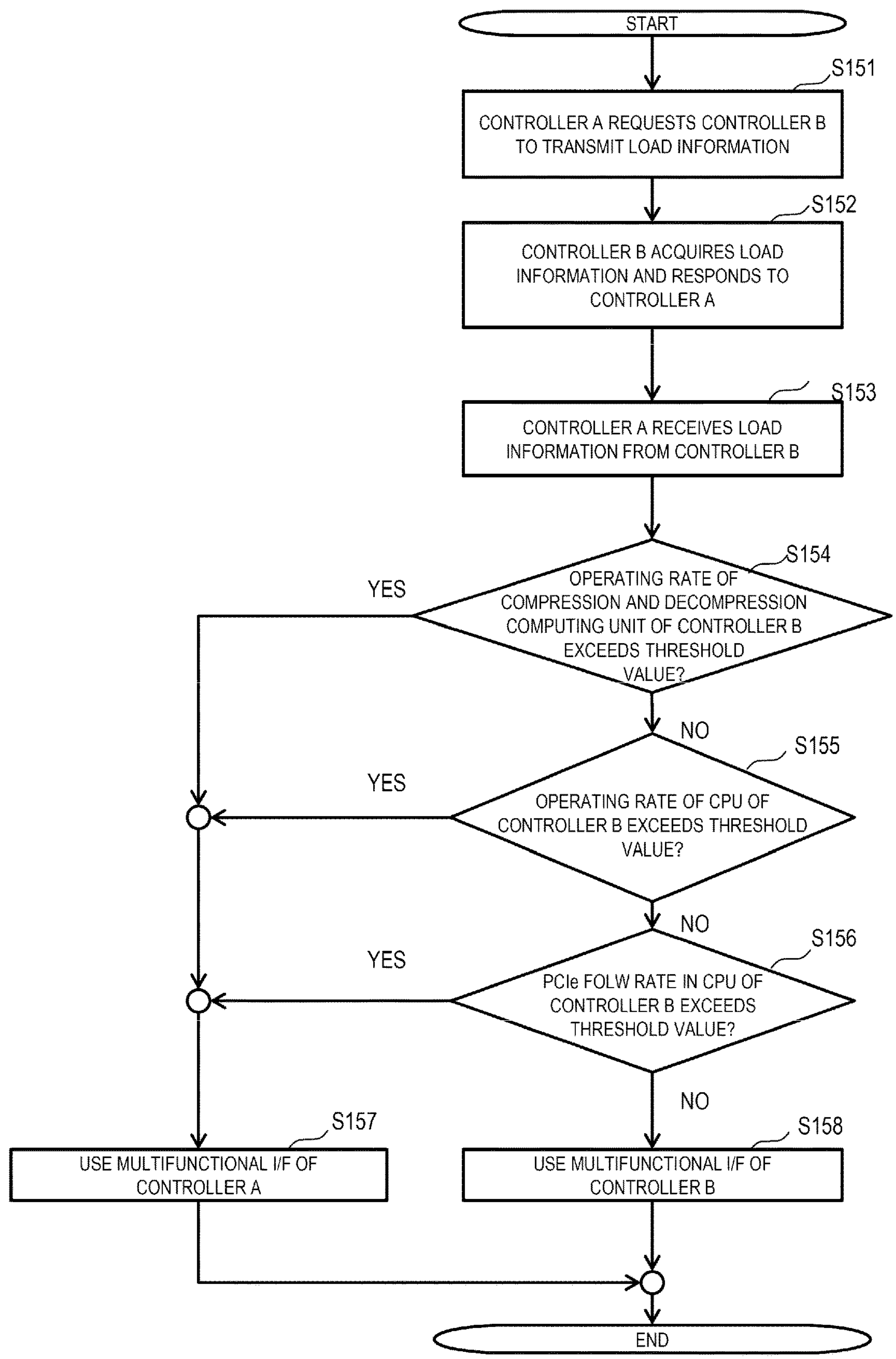
FIG. 17
START
S151
CONTROLLER A REQUESTS CONTROLLER B TO TRANSMIT LOAD INFORMATION
S152
CONTROLLER B ACQUIRES LOAD INFORMATION AND RESPONDS TO CONTROLLER A
S153
CONTROLLER A RECEIVES LOAD INFORMATION FROM CONTROLLER B
S154
OPERATING RATE OF COMPRESSION AND DECOMPRESSION COMPUTING UNIT OF CONTROLLER B EXCEEDS THRESHOLD VALUE?
YES
NO
S155
OPERATING RATE OF CPU OF CONTROLLER B EXCEEDS THRESHOLD VALUE?
YES
NO
S156
PCIe FOLW RATE IN CPU OF CONTROLLER B EXCEEDS THRESHOLD VALUE?
YES
NO
S157
USE MULTIFUNCTIONAL I/F OF CONTROLLER A
S158
USE MULTIFUNCTIONAL I/F OF CONTROLLER B
END

STORAGE SYSTEM AND CONTROL METHOD THEREOF

CLAIM OF PRIORITY

The present application claims priority from Japanese patent application JP 2021-179216 filed on Nov. 2, 2021, the content of which is hereby incorporated by reference into this application.

BACKGROUND OF THE INVENTION

1. Field of the Invention

The present invention relates to a storage system.

2. Description of the Related Art

Storage systems are required to have reduced storage costs per bit and improved IO performance. A data compression process can optimize capacity of the storage systems and increase actual capacity. The data compression process has a large computational load, and thus may cause a decrease in IO processing performance of the storage systems. In particular, data compressed by a high-compressibility algorithm tends to have a large load in a decompression process. Thus, it is important to improve host read throughput performance.

Related art of the present disclosure includes, for example, WO2016/151831 (Patent Literature 1). Patent Literature 1 discloses that "this storage system comprises a first control node, a second control node, and a final storage device for providing compressed volumes. The first control node: receives uncompressed host data from a host; compresses the uncompressed host data, thereby generating compressed host data; retains the compressed host data in a first memory as cached data; checks the validity of the compressed host data by decompressing the compressed host data; and transfers the compressed host data to the second control node if the compressed host data are valid. The second control node retains the compressed data in a second memory as cached data." (See, for example, the abstract).

A storage system implemented with a plurality of controllers involves a straight operation of completing a process by a controller after the controller received a read request from a host, and a cross operation of requesting a process from another controller. The cross operation requires a process of data transfer between the controllers in addition to the straight operation. Consequently, performance of the cross operation is lower than the performance of the straight operation. A large performance difference between the straight operation and the cross operation requires a path definition with consideration for the straight operation. Thus, it is required to improve the performance by reducing a processing amount of the cross operation.

SUMMARY OF THE INVENTION

A storage system according to one aspect of the invention includes: a first controller including a first computing device and a first memory; a second controller including a second computing device and a second memory; and an interface circuit configured to transfer data between the first controller and the second controller. The interface circuit is configured to: read first compressed data from the second memory; decompress the first compressed data to generate first uncompressed data; and write the first uncompressed data to the first memory.

According to one aspect of the invention, processes in a storage system can be optimized. Problems, configurations and effects other than those described above will become apparent from the following description of the embodiments.

BRIEF DESCRIPTION OF THE DRAWINGS

FIG. 7 illustrates a format example of instructions from the CPU to the multifunctional interface.

FIG. 8 illustrates a format example of responses to the CPU from the multifunctional interface.

FIG. 17 is a flowchart illustrating details of step S131 in the flowchart of FIG. 16.

DESCRIPTION OF THE PREFERRED EMBODIMENTS

Figure 1:
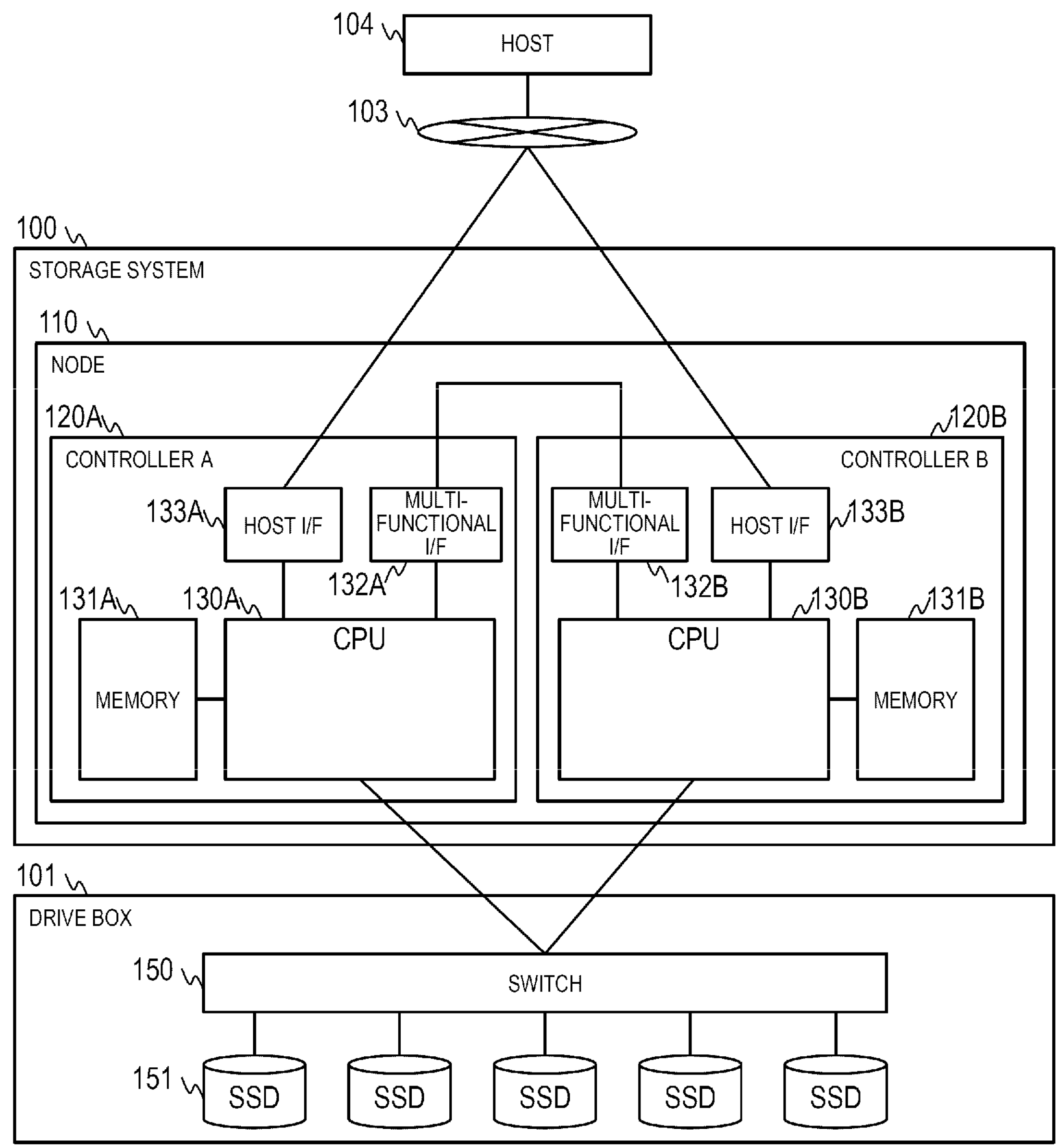
FIG. 1 is a diagram illustrating an example of a configuration of a computer system according to a first embodiment.

Embodiments of the invention will be described below with reference to the drawings. However, the invention should not be construed as being limited to the description of the embodiments described below. Those skilled in the art could have easily understood that the specific configuration of the invention can be changed without departing from a spirit or a gist of the invention. In configurations of the invention described below, the same or similar configurations or functions are denoted by the same reference numerals, and a repeated description thereof is omitted. In the present specification, expressions such as "first", "second", and "third" are used to identify the constituent components, and do not necessarily limit the number or order.

First Embodiment

FIG. 1 is a diagram illustrating an example of a configuration of a computer system according to a first embodiment. The computer system includes a storage system 100, a drive box 101, and a host 104. The host 104 is connected to the storage system 100 via a network 103.

The configuration of the computer system illustrated in FIG. 1 is one example, and is not limited thereto. For example, a storage system in which the storage system 100 and the drive box 101 are integrated may also be used. Alternatively, the host 104 and the storage system 100 may also form a hyper-converged system obtained by tightly coupling hardware and software.

The network 103 is, for example, a storage area network (SAN), a local area network (LAN), or a wide area network (WAN). The connection method of the network 103 may be either wireless or wired.

The host 104 is a computer that writes data to a storage area provided by the storage system 100 and reads data from the storage area. The host 104 includes a CPU, a memory, and an interface, which are not illustrated in the drawings.

The drive box 101 is a device that accommodates a plurality of storage drives 151. The drive box 101 includes a switch 150 and the plurality of storage drives 151. The plurality of the storage drives 151 may form a RAID group. The storage system 100 may generate a logical unit (LU) on the RAID group as a storage area to be provided to the host 104.

The switch 150 connects CPUs 130A and 130B included in controllers 120A and 120B of the storage system 100 to the storage drives 151. The controllers 120A and 120B are also referred to as storage controllers 120A and 120B. The CPUs 130A and 130B are computing devices. The controllers 120A and 120B can access the storage drives 151 via the switch 150. In the first embodiment, the CPUs 130A and 130B and the switch 150 are connected via a PCIe bus. The storage drives 151 and the switch 150 are connected via a PCIe bus.

The switch 150 includes a plurality of ports connected to the storage drives 151. The switch 150 expands the number of the ports on the PCIe bus. The switch 150 may be omitted and the storage drives 151 may be directly connected to the CPUs 130A and 130B.

The storage drives 151 are devices that provide the storage area used by the host 104. The storage drives 151 according to the first embodiment are typically NVMe drives, which communicate with the CPUs via a PCIe bus and perform processes according to NVMe protocol. The storage drives 151 may include a SATA drive or the like.

For example, a highly available dual-port NVMe SSD can be used as the storage drives 151. The protocol or communication path of the storage drives 151 is not limited, and the communication path may be Ethernet or the like as long as the storage drives 151 can read and write memories of a plurality of nodes 110 through a communication path other than the PCIe bus.

The storage system 100 provides the storage area to the host 104. The storage system 100 may include a plurality of nodes 110 and is connected to the drive box 101. FIG. 1 illustrates one node 110 as an example. The node 110 is a device that controls the storage system 100, and includes a controller A (120A) and a controller B (120B).

In the following, the controller A will be referred to as the controller 120A, and the controller B will be referred to as the controller 120B. In the configuration example of FIG. 1, two controllers, 120A and 120B, are included in the storage system 100. The number of the controllers may also be three or more.

The controller 120A includes a CPU 130A, a memory 131A, a multifunctional interface (interface circuit) 132A between controllers, and a host interface 133A. The controller 120B includes a CPU 130B, a memory 131B, a multifunctional interface (interface circuit) 132B between controllers, and a host interface 133B.

Figure 2:
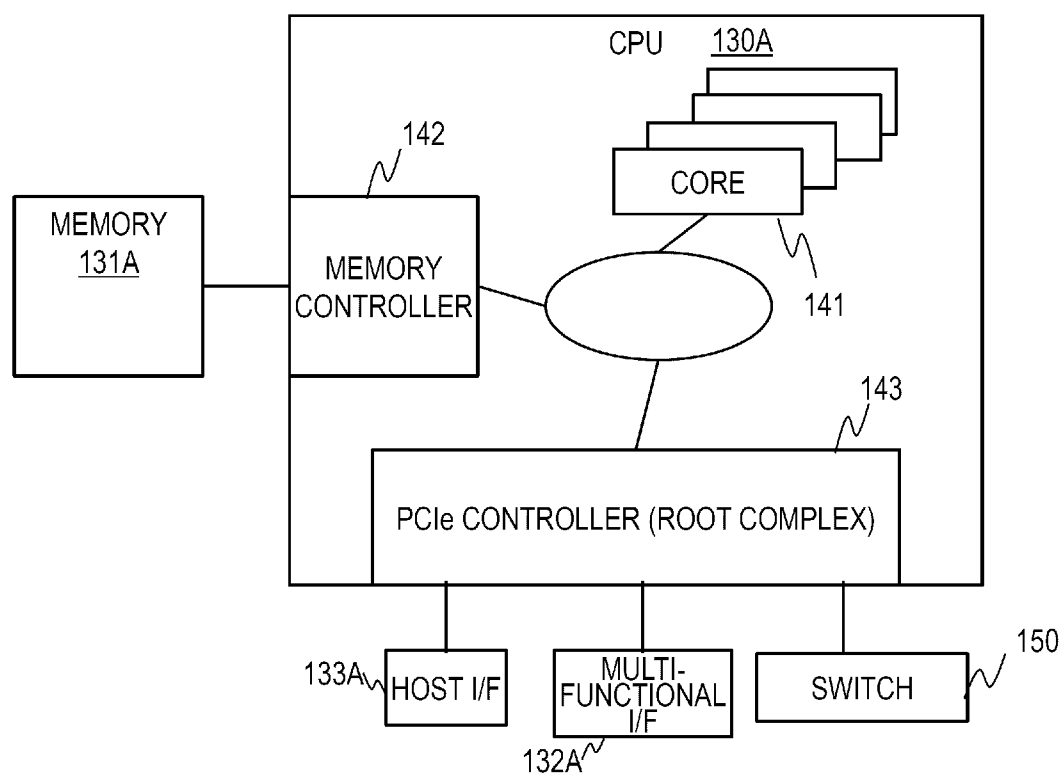
FIG. 2 illustrates a configuration example of a CPU.

Hereinafter, the controller 120A will be described, but the same description can be applied to the controller 120B. FIG. 2 illustrates a configuration example of the CPU 130A. The CPU 130A is a processor that performs various calculations. The CPU 130A includes a core 141, a memory controller 142 and a bus controller 143 which communicate with each other via an internal bus. In this example, the bus controller is a PCIe controller. In the configuration example of FIG. 2, a plurality of cores 141 are implemented. The number of each component of the CPU 130A may be any number.

The CPU 130A executes a program stored in the memory 131A. The CPU 130A executes a process according to the program to operate as a functional unit that realizes a specific function.

The core 141 is hardware that executes computational processes. The memory controller 142 controls communications between the CPU 130A and the memory 131A. The PCIe controller 143 is a root complex and controls the communication with devices connected to the CPU 130A via the PCIe bus. The PCIe controller 143 has ports connected to the host interface 133A, the multifunctional interface 132A, and the switch 150.

Returning to FIG. 1, the memory 131A is a storage device including at least either a volatile storage element such as dynamic random access memory (DRAM) or a nonvolatile storage elements such as NAND flash, spin transfer torque random access memory (STT-RAM) or phase-change memory (PCM). The memory 131A is set with a storage area for storing the program executed by the CPU 130A and various types of information, and a storage area for temporarily storing host data.

The multifunctional interface 132A is an interface for the communication between the controllers. The multifunctional interface 132A is connected to the other controller via the PCIe bus. As will be described later, the multifunctional interface 132A has a function of directly accessing the memories 131A and 131B of the controllers 120A and 120B and a function of compressing and decompressing the host data.

The host interface 133A is an interface for connecting to the host 104. The host interface 133A is an Ethernet adapter (Ethernet is a registered trademark), an InfiniBand, a Host Bus adapter, a PCI Express bridge, or the like.

In the configuration example of FIG. 1, the two controllers, 120A and 120B, include the multifunctional interfaces 132A and 132B, respectively. The multifunctional interfaces 132A and 132B may also be implemented alone.

Figure 3:
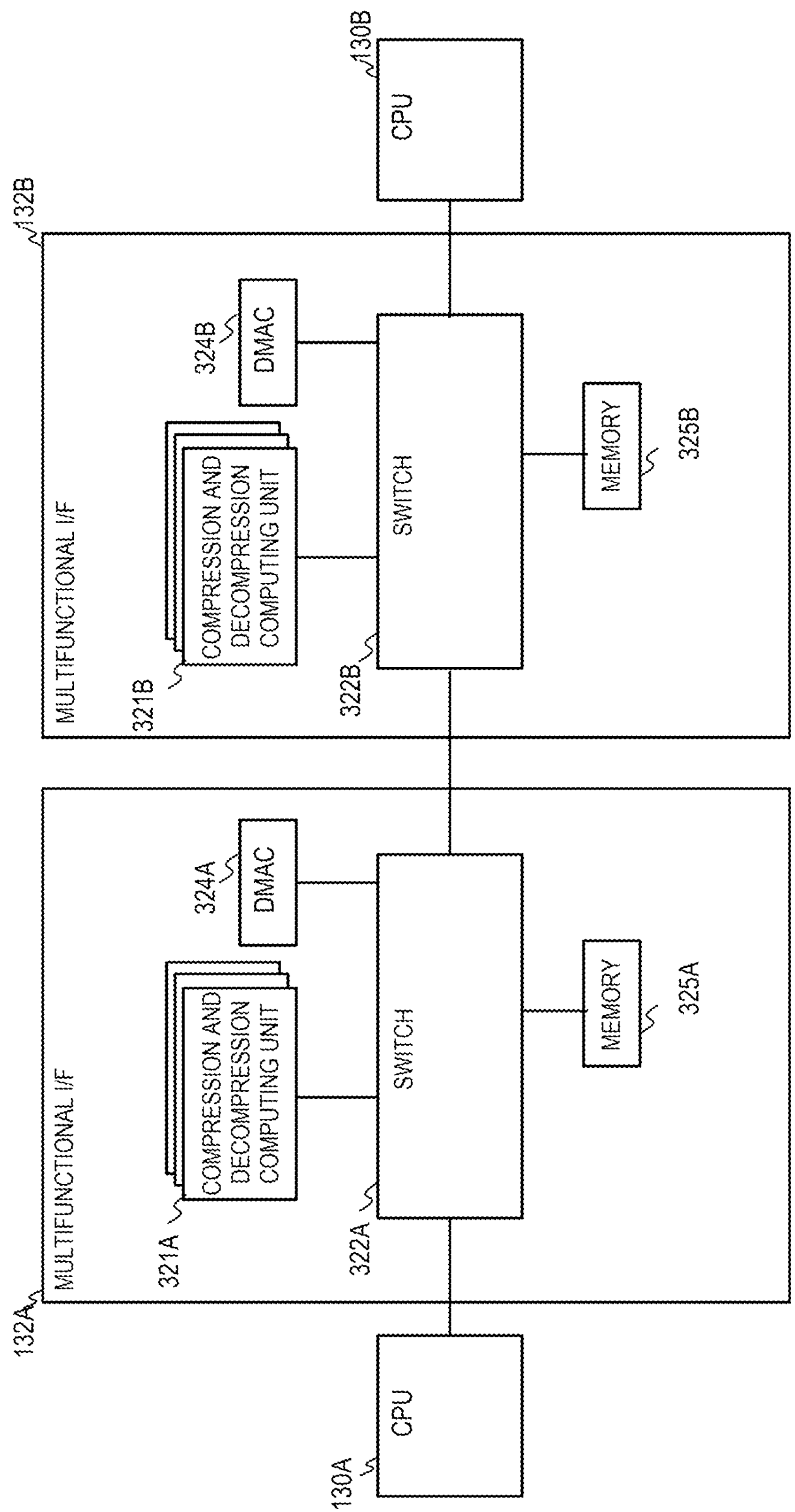
FIG. 3 schematically illustrates a configuration example of a multifunctional interface.

FIG. 3 schematically illustrates a configuration example of the multifunctional interfaces 132A and 132B. The multifunctional interface 132A includes a compression and decompression computing unit 321A, a switch 322A, a direct memory access (DMA) controller 324A, and a memory 325A. The multifunctional interface 132B includes a compression and decompression computing unit 321B, a switch 322B, a direct memory access (DMA) controller 324B, and a memory 325B.

The switch 322A is connected to the other components in the multifunctional interface 132A, that is, the compression and decompression computing unit 321A, the DMA controller 324A, and the memory 325A. The switch 322A is connected to the CPU 130A in the controller 120A, which includes the switch 322A, and is further connected to the switch 322B of the other multifunctional interface 132B.

The switch 322B is connected to other components in the multifunctional interface 132B, that is, the compression and decompression computing unit 321B, the DMA controller 324B, and the memory 325B. The switch 322B is connected to the CPU 130B in the controller 120B, which includes the switch 322B, and is further connected to the switch 322A of the other multifunctional interface 132A.

The components in the CPUs 130A, 130B and the two multifunctional interfaces 132A, 132B of the different controllers 120A and 120B can communicate via the switches 322A and/or 322B. The switches 322A and 322B are PCIe switches in this example.

In the configuration example of FIG. 3, a plurality of compression and decompression computing units 321A and a plurality of compression and decompression computing units 321B are implemented, and a compression process or a decompression process can be executed in parallel. Due to the redundancy, operations of the multifunctional interfaces 132A and 132B can be continued. The number of implemented compression and decompression computing units 321A or 321B may also be one.

The compression and decompression computing units 321A and 321B compress the host data received from the host 104 and decompress the compressed data read from the storage drives 151. The compression and decompression computing units 321A and 321B can use any compression algorithm. Different compression algorithms may be provided for different attributes of the host data. The compressed data and the decompressed data are temporarily stored in the memory 325A or 325B. The memories 325A and 325B may be, for example, SRAM or DRAM.

The DMA controller 324A accesses the memory 131A of the controller 120A by the switch 322A, or accesses the memory 131B of the controller 120B by the switch 322A and the switch 322B, so as to transfer data between the memories 131A and 131B. Similarly, the DMA controller 324B accesses the memory 131B by the switch 322B, or accesses the memory 131A by the switch 322B and the switch 322A, so as to transfer data between the memories 131A and 131B. That is, the DMA controllers 324A and 324B transfer data between the memories 131A and 131B of the two controllers 120A and 120A without cooperation of the cores of the CPUs 130A and 130B.

Figure 4:
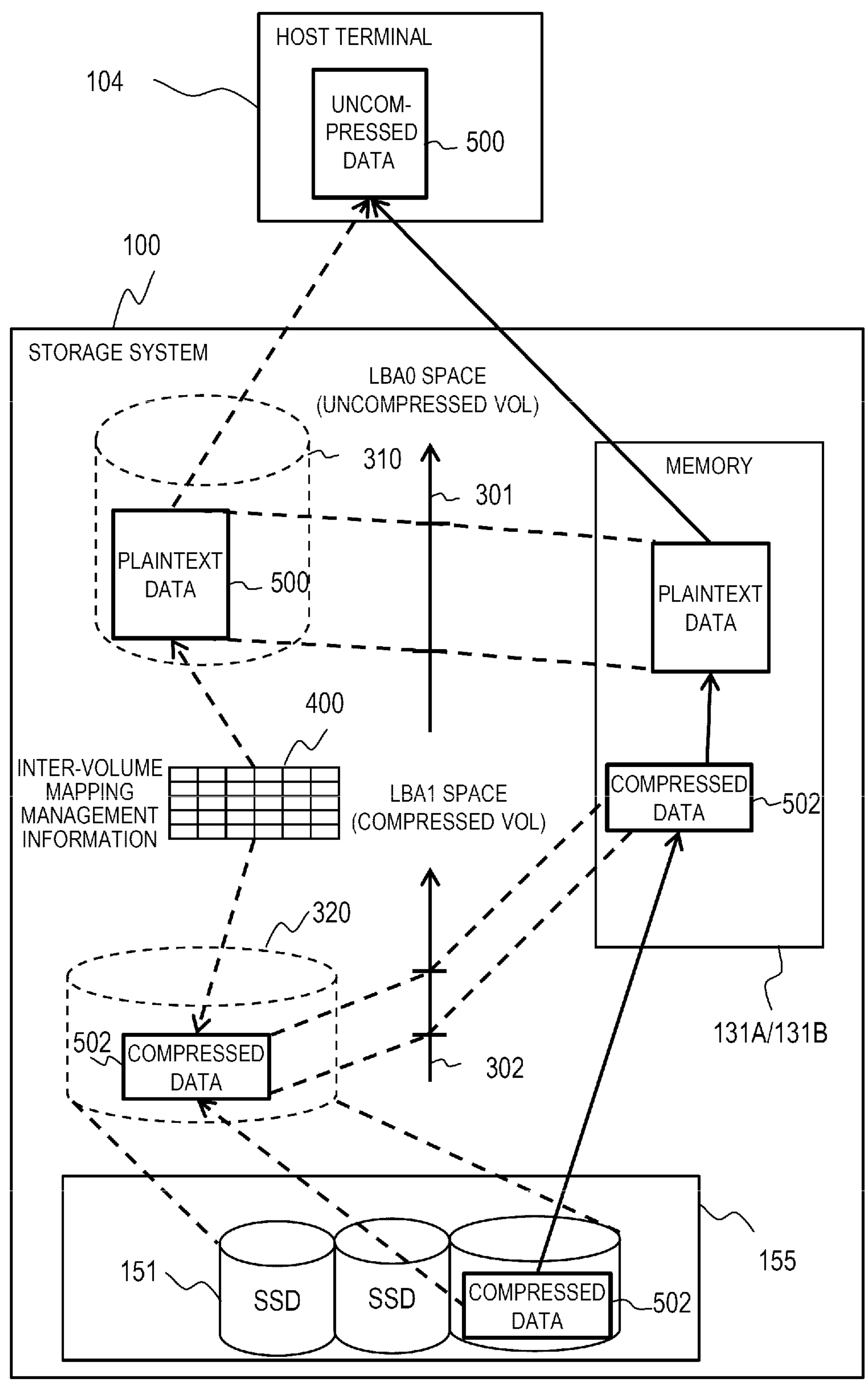
FIG. 4 illustrates an example of mapping between volumes defined in a storage system.

FIG. 4 illustrates an example of mapping between volumes defined within the storage system 100. The storage system 100 manages an uncompressed volume 310 and a compressed volume 320. The uncompressed volume 310 is provided to the host 104 and can be accessed by the host 104.

An address space (LBA0 space) 301 is defined for the uncompressed volume 310. LBA stands for logical block address. The host 104 specifies the uncompressed volume 310 and an address in the address space 301, and writes and reads the host data to and from the storage system 100. The host data received from the host 104 and the host data returned to the host 104 are uncompressed data 500 which is not compressed. The uncompressed data 500 is stored in the uncompressed volume 310, and is assigned with the address specified by the host 104 in the address space 301 specified by the host 104.

In the configuration example of FIG. 4, the uncompressed data 500 is compressed by the compression and decompression computing unit 321A or 321B and converted into compressed data 502. The compressed data 502 is stored in media of one or more storage drives 151.

The compressed volume 320 is used to manage the compressed data 502 stored in the storage drives 151. An address space (LBA1 space) 302 is defined for the compressed volume 320. The compressed data 502 is stored in the compressed volume 320, and is assigned with an address in the address space 302. The mapping between the address of the compressed volume 320 and the address of the uncompressed volume 310 is managed based on inter-volume mapping management information 400.

In the configuration example of FIG. 4, the plurality of storage drives 151 form a parity group 155, and the address of the parity group 155 and the address of the compressed volume 320 are managed based on mapping management information (not illustrated).

The parity group is also referred to as redundant arrays of independent disks (RAID) group. The parity group stores redundant data generated from the host data, in addition to the host data. By separately storing the host data and the redundant data in the plurality of storage drives 151, the host data can be restored even if any storage drive 151 for storing the host data fails.

An example of a flow of the host 104 reading the compressed data 502 stored in the parity group 155 will be described. The host 104 specifies the address of the uncompressed volume 310 and sends a read request for the uncompressed data 500 to the storage system 100. The storage system 100 refers to the inter-volume mapping management information 400 to specify the address of the compressed volume 320 corresponding to the specified address.

The storage system 100 reads the compressed data 502 of the specified address of the compressed volume 320 from the parity group 155 and stores the compressed data 502 in the memory 131A or 131B. The compression and decompression computing unit 321A or 321B decompresses the compressed data 502 and converts the compressed data 502 into the uncompressed data 500. The uncompressed data 500 is stored in the memory 131A or 131B. The storage system 100 returns the read uncompressed data 500 to the host 104.

Figure 5:
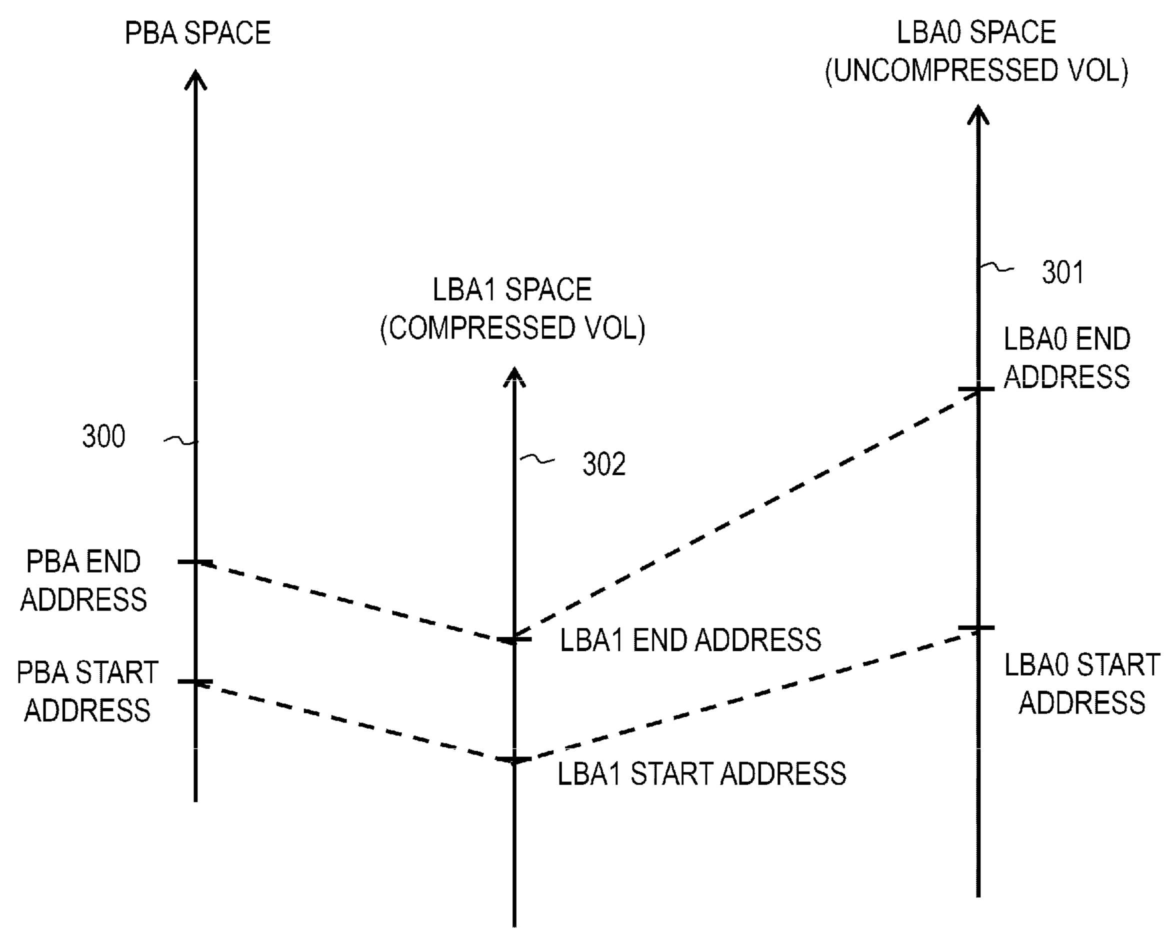
FIG. 5 is a schematic diagram illustrating relations between a physical address space (PBA space) provided by a parity group, an address space of a compressed volume, and an address space of an uncompressed volume.

FIG. 5 is a schematic diagram illustrating relations between a physical address space (PBA space) 300 provided by the parity group 155 (the plurality of storage drives 151), the address space 302 of the compressed volume 320, and the address space 301 of the uncompressed volume 310. FIG. 5 illustrates, for example, the addresses of the compressed data 502 and the uncompressed data 500.

A start address and an end address of the compressed data 502 in the PBA space 300 are associated with a start address and an end address of the compressed data 502 in the address space 302 of the compressed volume 320, respectively. The start address and the end address of the compressed data 502 in the address space 302 of the compressed volume 320 are associated with a start address and an end address of the uncompressed data 500 of the address space 301 of the uncompressed volume 310, respectively. As described above, the mapping between the address space 302 of the compressed volume 320 and the address space 301 of the uncompressed volume 310 is managed based on the inter-volume mapping management information 400.

Figure 6:
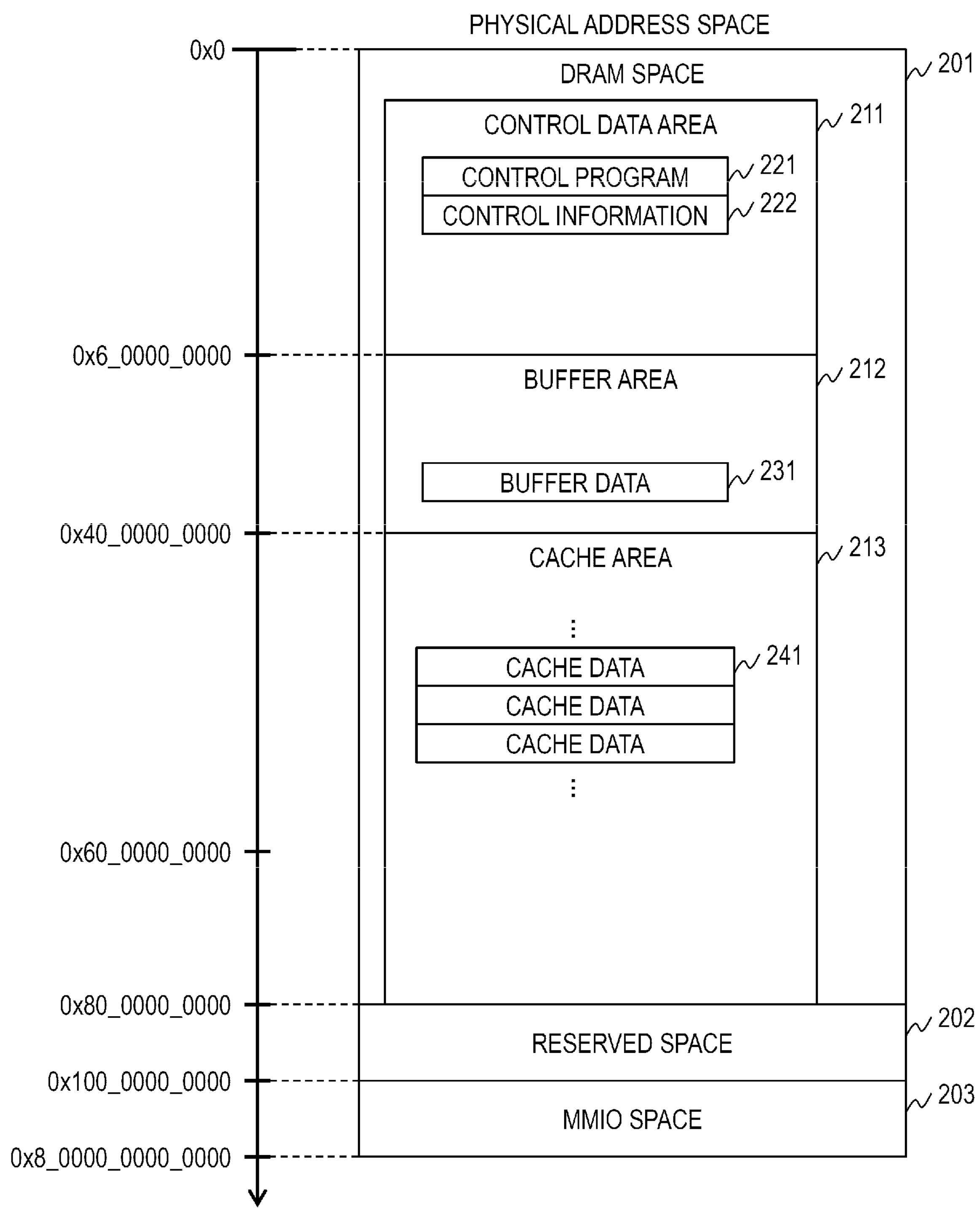
FIG. 6 illustrates a schematic diagram of a memory map in a controller of the storage system.

FIG. 6 illustrates a schematic diagram of a memory map in the controller 120A of the storage system 100. Similar description applies to the controller 120B. FIG. 6 is a diagram illustrating a physical address space of a memory managed by the controller 120A. The physical address space includes a DRAM space 201, a reserved space 202, and an MMIO space 203.

The reserved space 202 is an inaccessible address space. The MMIO space 203 is an address space used to access IO devices. The controller 120A performs management to prohibit access (writing) to the reserved space 202 and the MMIO space 203 from the storage drives 151.

The DRAM space 201 is an address space used to access the memory 131A. The DRAM space 201 includes an address space in which a control data area 211, a buffer area 212, and a cache area 213 of the memory 131A are mapped.

The control data area 211 is a storage area for storing programs and information for controlling the storage system 100. The control data area 211 stores a control program 221 and control information 222.

The control program 221 is a program for realizing a function of controlling the storage system 100 (storage control unit). The control information 222 is information for controlling the storage system 100. The control information 222 includes, for example, a cache directory, data for managing buffer data (temporary data) 231, data for managing cache data 241, commands for controlling various devices, and data shared between the controllers 120A and 120B. The control information 222 includes data for managing the RAID configuration, and information for managing the correspondence between the storage areas provided to the host 104 and the storage drives 151.

The cache directory is managed, for example, in a unit called a segment having a size of 64 kB. Specifically, the cache directory is managed as a list of a segment state, LRU information, MRU information, a bit map indicating dirty state or clean state, a physical address of the memory 131A, and the like.

The buffer area 212 is a storage area for storing the buffer data 231. The buffer data 231 is discarded after an IO process is completed. The controller 120A performs management to allow access (writing) to the buffer area 212 from the storage drives 151.

The cache area 213 is a storage area for storing the cache data 241. The cache data 241 includes cache data 241 in the dirty state and cache data 241 in the clean state.

The cache data 241 in the dirty state is data that exists only in the memories 131. The cache data 241 in the clean state is data destaged into the storage drives 151. When destaged into the storage drives 151, the cache data 241 in the dirty state is managed as cache data 241 in the clean state.

When the controller of the storage system 100 fails, the cache data 241 in the clean state can be restored by reading from the storage drives 151, but it is difficult to restore the cache data 241 in the dirty state from the failed controller. Thus, the cache data 241 in the dirty state is made redundant among the plurality of controllers 120. After the cache data 241 in the dirty state is destaged into the storage drives 151, the redundancy configuration can be canceled and the state can be changed from the dirty state to the clean state.

FIG. 7 illustrates a format example of instructions from the CPUs 130A and 130B to the multifunctional interfaces 132A and 132B. The CPUs 130A and 130B each can transmit instructions to either one of the multifunctional interfaces 132A and 132B. A command 530 indicates contents of a plurality of instruction items. FIG. 7 illustrates an example of the instruction items included in the command 530, which may also include other items or have some items omitted.

A command ID 533 indicates an ID that identifies the command 530. A processing instruction content 534 indicates a content of a process instructed to the multifunctional interfaces. Examples of the instructed process include compression, decompression, and transfer methods of data.

A transfer source start address 535 indicates a start address in a memory in which target data to be transferred is stored. A transfer destination start address 0 (536) indicates a start address in a transfer destination memory of the target data. A transfer destination start address 1 (537) indicates a start address in the transfer destination memory of the target data. The command 530 can specify two transfer destinations by the transfer destination start address 0 (536) and the transfer destination start address 1 (537). As a result, the target data becomes redundant. One transfer destination may be specified alone. A transfer length 538 indicates data length of the target data in a transfer source memory.

A compression algorithm type 539 specifies the compression algorithm for the target data. The compression algorithm may be selected, for example, according to the attributes of the target data. A check instruction of compressed data guarantee code ID 540 indicates whether it is necessary to check a compressed data guarantee code ID. An expected value of compressed data guarantee code ID 541 indicates an expected value of the compressed data guarantee code ID. An assignment instruction of decompressed data guarantee code ID 542 indicates whether it is necessary to assign a guarantee code ID to the decompressed data. A type of decompressed data guarantee code ID 543 indicates data for generating the decompressed data guarantee code ID.

FIG. 8 illustrates a format example of a response to the CPUs 130A and 130B from the multifunctional interfaces 132A and 132B. A multifunctional interface receives the command 530 from a CPU, and then returns a response 550 indicating a result of an instruction process to the CPU as the instruction source. The response 550 indicates contents of a plurality of response items. FIG. 8 illustrates an example of the response items included in the response 550, which may also include other items, or have some items omitted.

A command ID 553 indicates the command ID of the command 530 corresponding to the response 550. A status 554 indicates a state that is an execution result of the process instructed by the command 530. The status 554 may indicate, for example, that the process has been completed normally, that an error has occurred in the process, or the like.

Hereinafter, an operation of reading the storage system 100 in response to the read request from the host 104 will be described. The read operation according to the read request from the host 104 includes two types: a straight read operation and a cross read operation. The straight read operation is completed in the controller that received the read request from the host 104. The cross operation includes data transfer between the controllers in addition to the normal straight operation.

In the embodiment of the present specification, the multifunctional interfaces 132A and 132B perform data decompression and compression processes in addition to the data transfer between the memories 131A and 131B of the controllers 120A and 120B. Thus, it is possible to improve the performance of the cross read operation.

Figure 9:
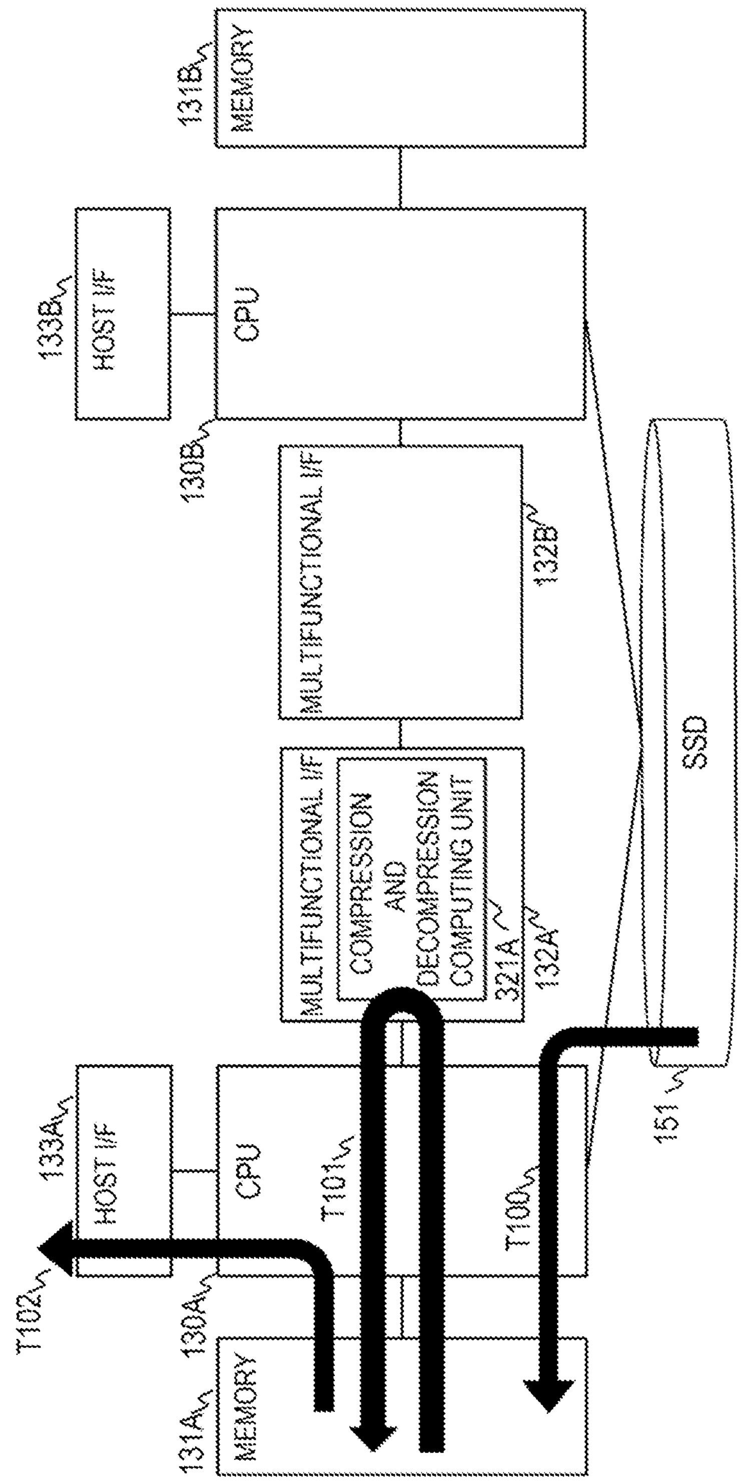
FIG. 9 illustrates a flow of host data in a straight read operation.

FIG. 9 illustrates a flow of the host data in the straight read operation. In the example of the straight read operation illustrated in FIG. 9, the controller 120A receives the read request from the host 104. The controller 120A has ownership of the uncompressed volume 310 which is the read request destination. The controller having the ownership manages the compressed volume 320 corresponding to the uncompressed volume 310, and writes and reads the compressed data to and from the storage drives 151.

The CPU 130A of the controller 120A receives the read request for the uncompressed volume 310 from the host 104 via the host interface 133A. The CPU 130A refers to the inter-volume mapping management information 400 to determine the address of the compressed volume 320 corresponding to the address specified by the read request.

The CPU 130A reads the compressed data 502 from the address of the storage drives 151 corresponding to the address of the compressed volume 320 via the switch 150, and stores the compressed data 502 in the buffer area 212 of the memory 131A. The compressed data 502 is transferred from the storage drives 151 to the memory 131A via the PCIe controller 143 and the memory controller 142 of the CPU 130A (T100). Storing the compressed data 502 in the buffer area improves memory utilization efficiency.

Next, the CPU 130A instructs the multifunctional interface 132A to decompress the compressed data 502. The command 530 specifies an address where the compressed data 502 is stored and an address of the cache area 213 where the decompressed uncompressed data 500 is to be stored. The command 530 is transmitted and received via the control data area 211.

The multifunctional interface 132A reads the compressed data 502 from the memory 131A and performs the decompression process to convert the compressed data 502 into the uncompressed data 500. The multifunctional interface 132A transfers the uncompressed data 500 to the specified address of the memory 131A. In this manner, the compressed data 502 is transferred from the memory 131A to the multifunctional interface 132A, and the uncompressed data 500 is further transferred from the multifunctional interface 132A to the memory 131A (T101). The multifunctional interface 132A is used to reduce the amount of data transfer in the storage system.

Specifically, the DMA controller 324A of the multifunctional interface 132A reads the specified compressed data 502 from the memory 131A via the switch 322A of the multifunctional interface 132A, and the PCIe controller 143 and the memory controller 142 of the CPU 130A. The compressed data 502 is stored in the memory 325A of the multifunctional interface 132A.

The compression and decompression computing unit 321A decompresses the compressed data in the memory 325A to generate the uncompressed data 500, and stores the uncompressed data 500 in the memory 325A. The DMA controller 324A writes the uncompressed data 500 to the specified address of the memory 131A via the switch 322A, the PCIe controller 143 and the memory controller 142. The multifunctional interface 132A returns the response 550 to the command 530 to the CPU 130A via the control data area 211.

The CPU 130A receives the response 550, and then reads the uncompressed data 500 stored in the cache area 213. The CPU 130A returns the uncompressed data 500 to the host 104 via the host interface 133A.

Figure 10:
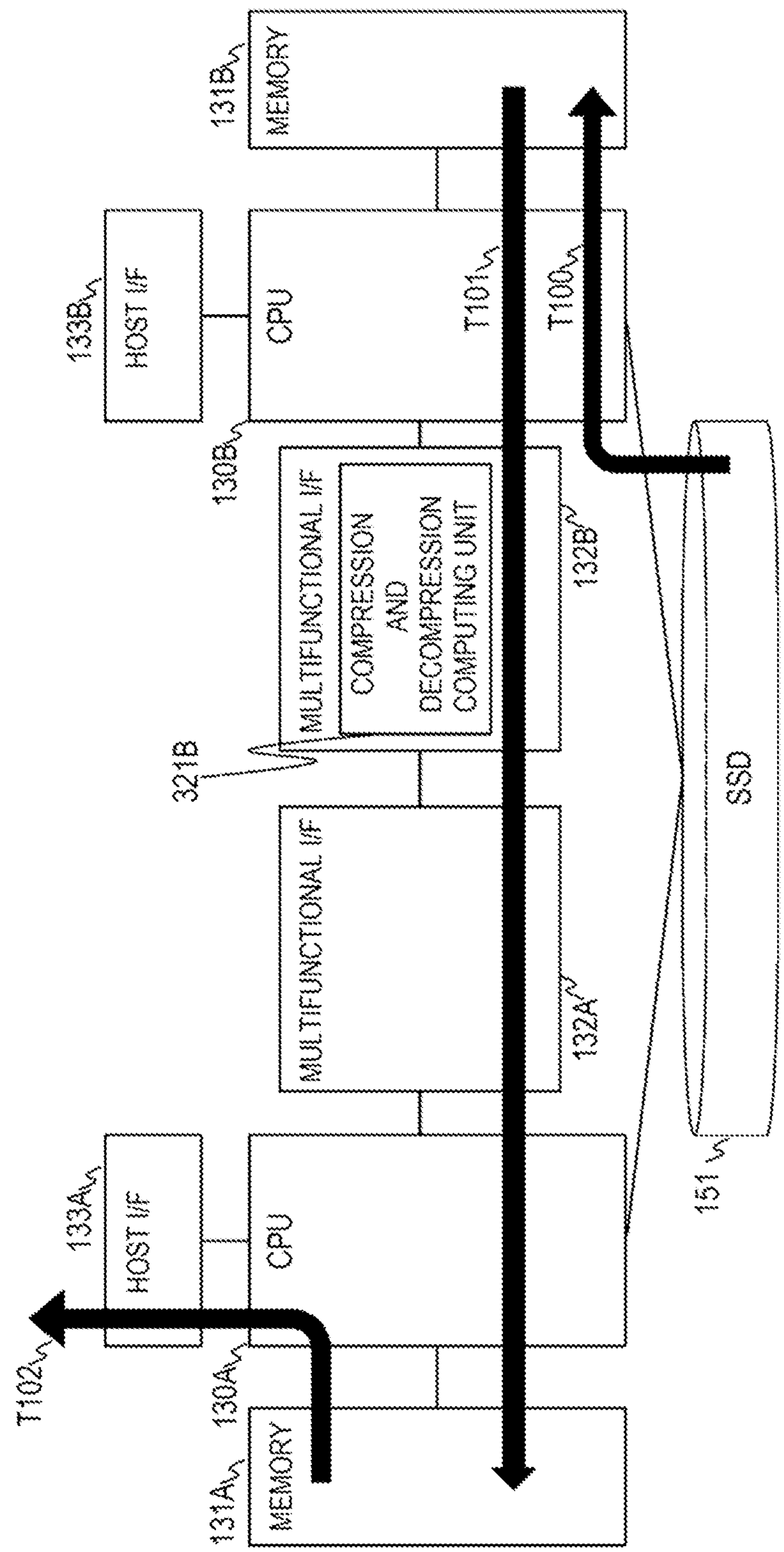
FIG. 10 illustrates a flow of the host data in a cross read operation.

FIG. 10 illustrates a flow of the host data in the cross read operation. In the example of the cross read operation illustrated in FIG. 10, the controller 120A receives the read request from the host 104 and returns the host data to the host 104. The controller 120B has the ownership of the uncompressed volume 310 which is the read request destination. The controller 120B having the ownership manages the compressed volume 320 corresponding to the uncompressed volume 310, and writes the compressed data to the storage drives 151 and reads the compressed data.

The CPU 130A of the controller 120A receives the read request for the uncompressed volume 310 from the host 104 via the host interface 133A. The CPU 130A transfers the received read request to the CPU 130B of the controller 120B via the multifunctional interfaces 132A and 132B.

The CPU 130B refers to the inter-volume mapping management information 400 to determine the address of the compressed volume 320 corresponding to the address specified by the read request. The CPU 130B reads the compressed data 502 from the address of the storage drives 151 corresponding to the address of the compressed volume 320 via the switch 150, and stores the compressed data 502 in the buffer area 212 of the memory 131B. The compressed data 502 is transferred from the storage drives 151 to the memory 131B via the PCIe controller 143 and the memory controller 142 of the CPU 130B (T100).

Next, the CPU 130B instructs the multifunctional interface 132B to decompress the compressed data 502. The command 530 specifies the address in the memory 131B where the compressed data 502 is stored and the address of the cache area 213 in the memory 131A where the decompressed uncompressed data 500 is to be stored.

The multifunctional interface 132B reads the compressed data 502 from the memory 131B, and performs the decompression process to convert the compressed data 502 into the uncompressed data 500. The multifunctional interface 132B transfers the uncompressed data 500 to the specified address of the memory 131A. In this manner, the compressed data 502 is transferred from the memory 131B to the multifunctional interface 132B, and the uncompressed data 500 is further transferred from the multifunctional interface 132B to the memory 131A (T101).

Figure 11:
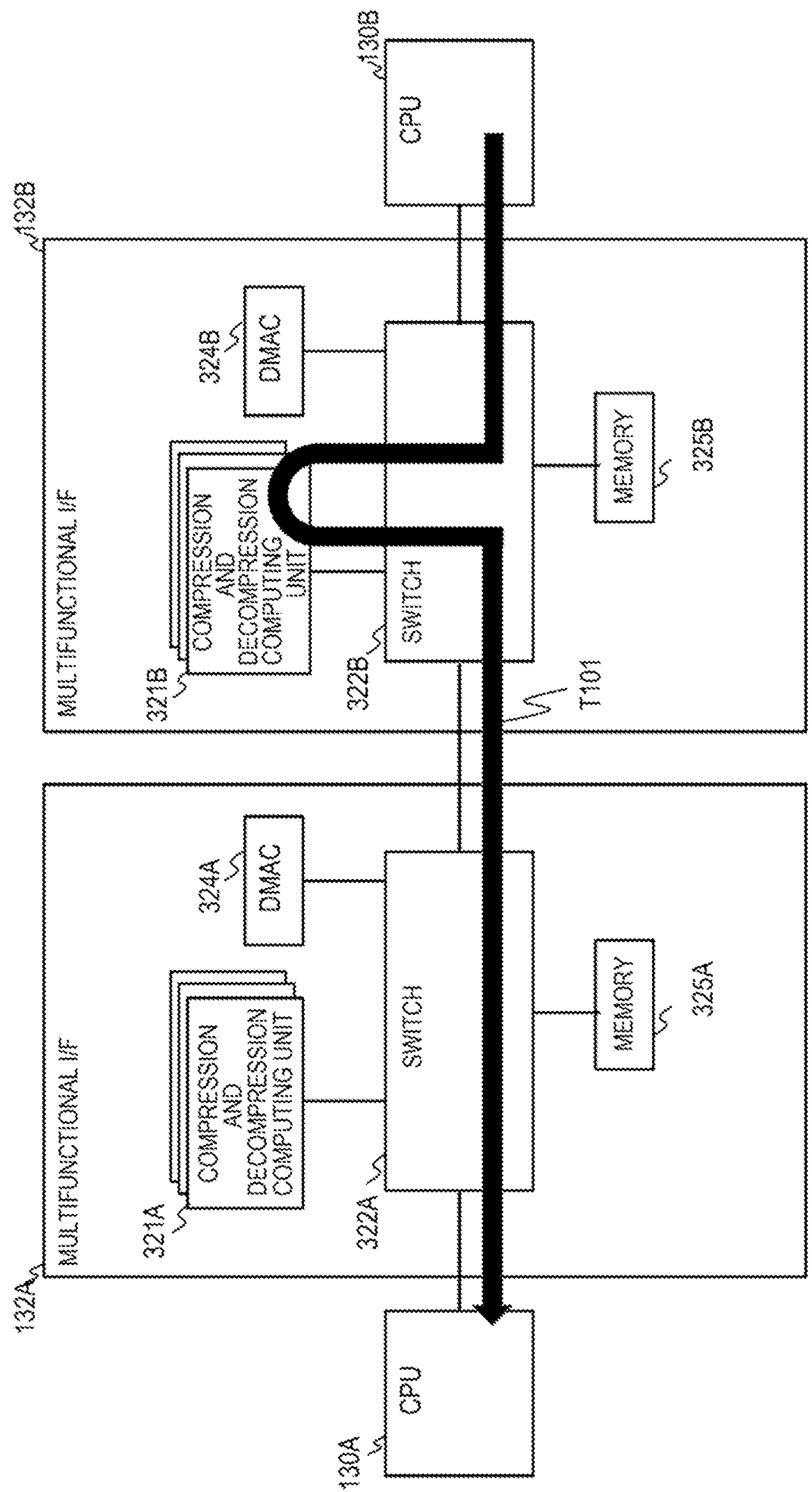
FIG. 11 illustrates details of a data flow between memories.

FIG. 11 illustrates details of the data flow T101 illustrated in FIG. 10. The DMA controller 324B of the multifunctional interface 132B reads the specified compressed data 502 from the memory 131B via the switch 322B of the multifunctional interface 132B, and the PCIe controller 143 and the memory controller 142 of the CPU 130B. The compressed data 502 is stored in the memory 325B of the multifunctional interface 132B.

The compression and decompression computing unit 321B decompresses the compressed data in the memory 325B to generate the uncompressed data 500, and stores the uncompressed data 500 in the memory 325B. The DMA controller 324B writes the uncompressed data 500 to the specified address of the memory 131A via the switch 322B, the switch 322A of the multifunctional interface 132A, and the PCIe controller 143 and the memory controller 142 of the CPU 130A. The multifunctional interface 132B returns the response 550 to the command 530 to the CPU 130B.

Returning to FIG. 10, the CPU 130B receives the response 550, and then returns a response to the transferred read request to the CPU 130A. The CPU 130A receives the response, and then reads the uncompressed data 500 stored in the cache area 213 of the memory 131A. The CPU 130A returns the uncompressed data 500 to the host 104 via the host interface 133A.

As described above, the multifunctional interfaces 132A and 132B are installed on a route of an inter-controller path. The multifunctional interfaces 132A and 132B include the compression and decompression computing units 321A and 321B and the DMA controllers 324A and 324B, in addition to the switches 322A and 322B which are inter-controller connection interfaces. Thus, it is possible to reduce an amount of memory access in the cross read operation. By the DMA controllers of the inter-controller path performing data transfer, a data transfer process can be implemented together with the decompression process by PCIe-to-memory transfer, while avoiding restriction of peer-to-peer transfer.

Figure 12:
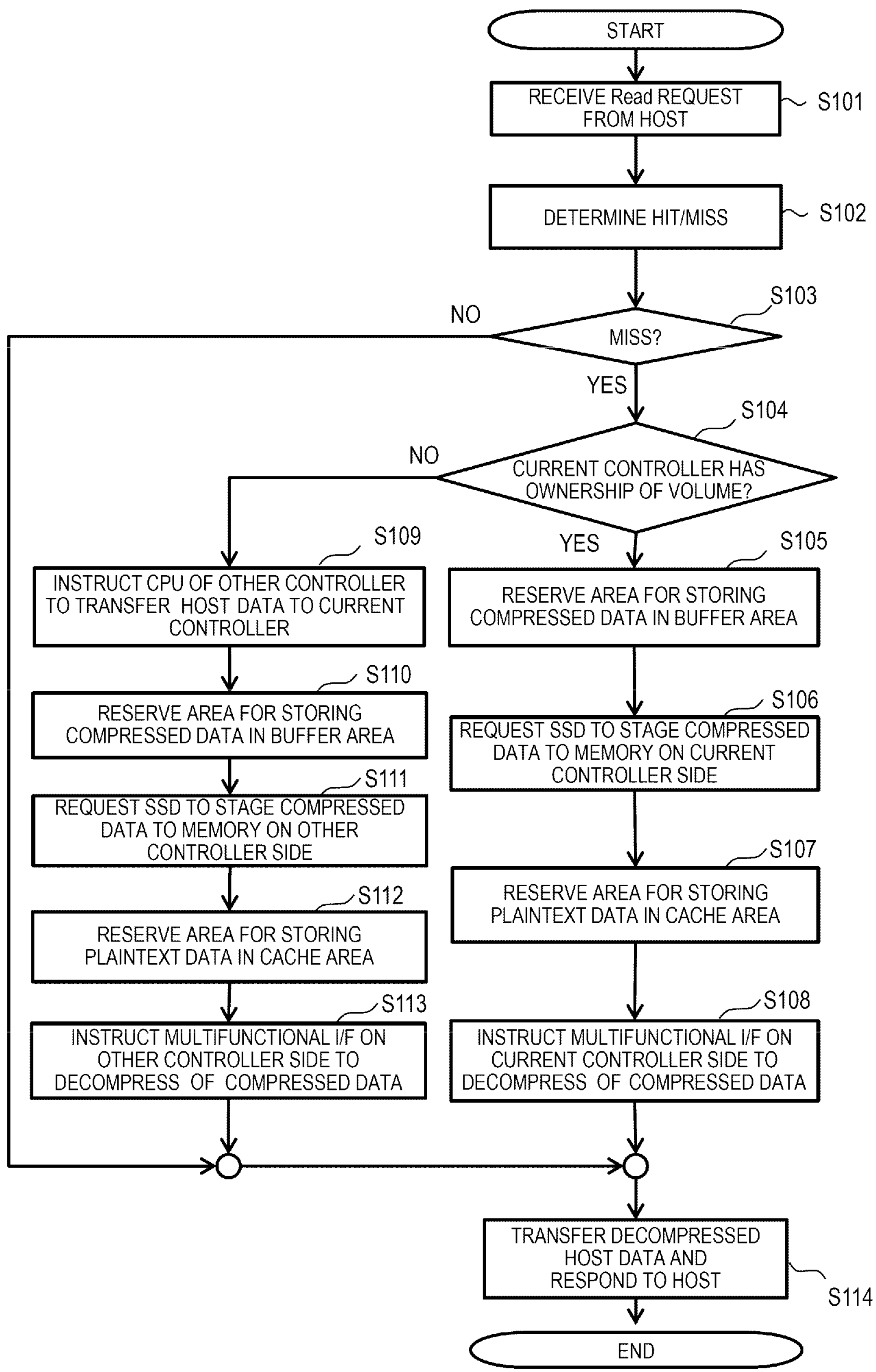
FIG. 12 is a flowchart illustrating an example of an operation of reading the storage system in response to a read request from a host.

FIG. 12 is a flowchart illustrating an example of the operation of reading the storage system 100 in response to the read request from the host 104. The controller 120A is assumed to receive the read request from the host 104. The controller 120A receives the read request from the host 104 (S101).

The CPU 130A determines hit/miss of the host data specified by the read request (S102). That is, the CPU 130A determines whether the host data is stored in the cache area 213 of the memory 131A or the memory 131B. The control information 222 of the memories 131A and 131B includes management information of the cache areas 213 of both the memories 131A and 131B.

When the specified host data is stored in the cache area 213 of either the memory 131A or 131B (S103: NO), the CPU 130A responds to the host 104 with the cache data stored in the cache area 213 (S114). When the host data is stored in the memory 131A, the CPU 130A reads the host data from the memory 131A and returns the host data to the host 104.

When the host data is stored in the memory 131B, the CPU 130A instructs the CPU 130B to transfer the host data. The CPU 130B instructs the multifunctional interface 132B to transfer the host data of the memory 131B to the memory 131A. The DMA controller 324B of the multifunctional interface 132B transfers the host data of the memory 131B to the memory 131A. The transfer of the host data may also be performed by the multifunctional interface 132A. The CPU 130A reads the host data from the memory 131A and returns the host data to the host 104.

When the specified host data is not stored in either of the cache areas (S103: YES), the CPU 130A determines the controller having the ownership of the specified uncompressed volume (S104).

When the controller 120A has the ownership (S104: YES), the CPU 130A reserves an area for storing the specified compressed data in the buffer area 212 of the memory 131A (S105). Further, the CPU 130A requires the storage drives 151 to store the compressed data in the reserved area of the buffer area 212 of the memory 131A (compressed data staging) (S106).

Next, the CPU 130A reserves an area for storing the uncompressed data in the cache area 213 of the memory 131A (S107). The CPU 130A specifies the address of the buffer area 212 where the compressed data is stored and the address of the cache area 213 where the decompressed data is to be stored with respect to the multifunctional interface 132A, and instructs the multifunctional interface 132A to decompress of the compressed data (S108).

The DMA controller 324A of the multifunctional interface 132A reads the compressed data from the buffer area 212, and the compression and decompression computing unit 321A decompresses the compressed data to generate the uncompressed data. The DMA controller 324A transfers the uncompressed data to the specified address in the cache area 213. The CPU 130A responds to the host 104 with the uncompressed data stored in the cache area 213 (S114).

In step S104, when the ownership of the uncompressed volume specified by the host 104 is held by a controller different from the controller 120A, in this example, the controller 120B, the flow proceeds to S109.

In step S109, the CPU 130A transfers the read request received from the host 104 to the CPU 130B of the controller 120B, so as to instruct the CPU 130B to transfer the host data (uncompressed data).

The CPU 130B reserves an area for storing the compressed data in the buffer area 212 of the memory 131B of the controller 120B (S110). Further, the CPU 130B requires the storage drives 151 to store the compressed data in the reserved area of the buffer area 212 of the memory 131B (compressed data staging) (S111).

The CPU 130B requests the CPU 130A to notify a transfer destination address of the uncompressed data. The CPU 130A reserves an area for storing the uncompressed data in the cache area 213 of the memory 131A of the controller 120A (S112). The CPU 130A notifies the CPU 130B of the address of the reserved area as the transfer destination address of the uncompressed data.

The CPU 130B specifies the address of the buffer area 212 of the memory 131B where the compressed data is stored and the address of the cache area 213 of the memory 131A where the decompressed data is to be stored with respect to the multifunctional interface 132B of the controller 120B, and instructs the multifunctional interface 132B to decompress the compressed data (S113). An effect is expected that failure propagation between the controllers is reduced by the CPU 130B controlling the multifunctional interface 132B to transmit the instructions in a short time and to avoid memory read through the switch 322B by the multifunctional interface 131A.

The DMA controller 324B of the multifunctional interface 132B reads the compressed data from the buffer area 212 of the memory 131B, and the compression and decompression computing unit 321B decompresses the compressed data to generate the uncompressed data. The DMA controller 324B transfers the uncompressed data to the specified address of the cache area 213 of the memory 131A. The CPU 130A responds to the host 104 with the uncompressed data stored in the cache area 213 of the memory 131A (S114).

Figure 13:
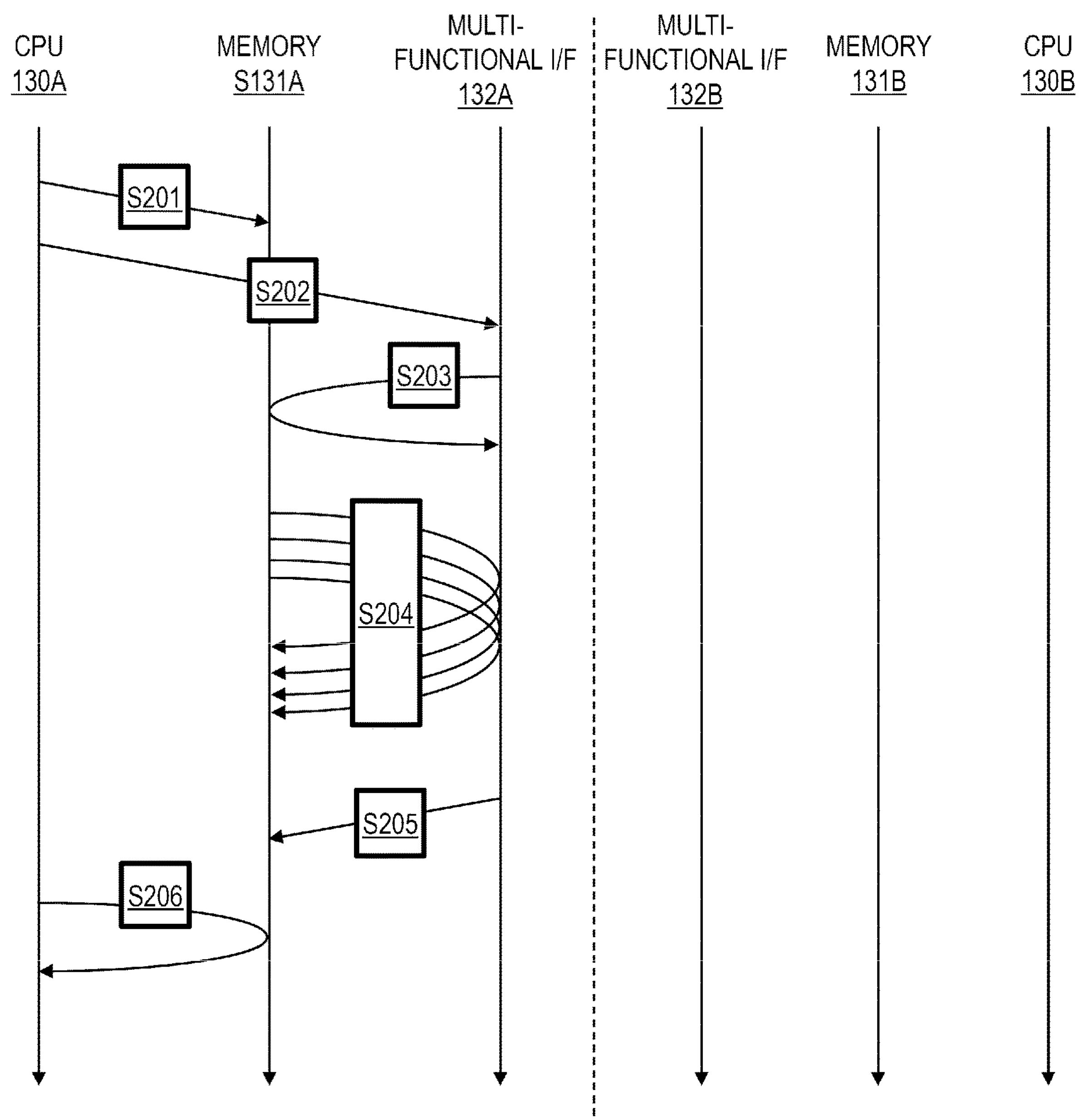
FIG. 13 is a sequence diagram illustrating details of processes in step S108 in the flowchart of FIG. 12.

FIG. 13 is a sequence diagram illustrating details of processes in step S108 in the flowchart of FIG. 12. In step S201, the CPU 130A creates, in the control data area 211 of the memory 131A, a command for instructing processing of the compression and decompression computing unit 321A of the multifunctional interface 132A.

In step S202, the CPU 130A operates a register of the multifunctional interface 132A to instruct the multifunctional interface 132A to read the command created in the memory 131A. Specifically, the CPU 130A stores the memory address where the command is stored and the number of commands to be executed in the register of the multifunctional interface 132A, and kicks the register.

In step S203, the multifunctional interface 132A receives the instruction, and then reads the command from the control data area 211 of the memory 131A by the DMA controller 324A. In step S204, the DMA controller 324A reads the compressed data from the memory 131A according to the content of the command, and stores the compressed data in the memory 325A of the multifunctional interface 132A. The compression and decompression computing unit 321A decompresses the compressed data to generate the uncompressed data, and stores the uncompressed data in the memory 325A. The DMA controller 324A outputs the uncompressed data to the address in the cache area 213 of the memory 131A specified in the command.

In step S205, the multifunctional interface 132A outputs, by the DMA controller 324A, a response (indicating success or failure) to the command to the control data area 211 of the memory 131A. A notification may be issued to the CPU 130A by using an interrupt or the like before the response is outputted. In step S206, the CPU 130A reads the response from the control data area 211 of the memory 131A and confirms the command execution result.

Figure 14:
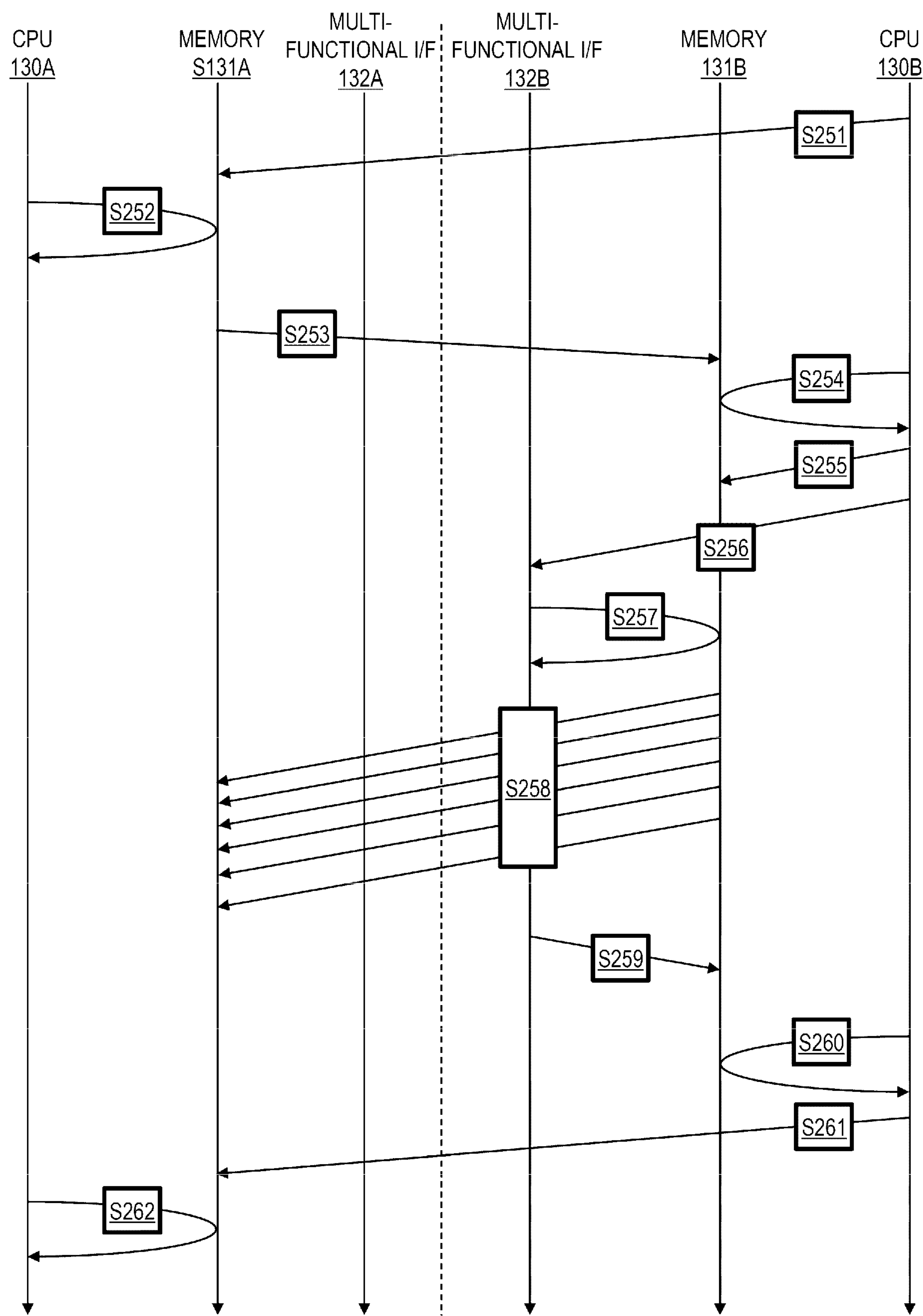
FIG. 14 is a sequence diagram illustrating details of processes in step S113 in the flowchart of FIG. 12.

FIG. 14 is a sequence diagram illustrating details of processes in step S113 in the flowchart of FIG. 12. In step S251, the CPU 130B of the controller 120B writes a message requesting the CPU 130A of the controller 120A to notify the transfer destination address of the decompressed data to the control data area 211 of the memory 131A of the controller 120A.

In step S252, the CPU 130A receives the message in the control data area 211 of the memory 131A. In step S253, the CPU 130A writes a message indicating the storage destination address of the decompressed data to the control data area 211 of the memory 131B of the controller 120B. In step S254, the CPU 130B of the controller 120B performs polling to receive the message in the control data area 211 of the memory 131B.

In step S255, the CPU 130B creates, in the control data area 211 of the memory 131B, a command for instructing processing of the multifunctional interface 132B.

In step S256, the CPU 130B operates the register of the multifunctional interface 132B to cause the multifunctional interface 132B to read the command created in the memory 131B. Specifically, the CPU 130B stores the memory address where the command is stored and the number of commands to be executed in the register of the multifunctional interface 132B, and kicks the register.

In step S257, the multifunctional interface 132B receives the instruction and then reads the command from the control data area 211 of the memory 131B by the DMA controller 324B. In step S258, the DMA controller 324A reads the compressed data from the memory 131B according to the content of the command and stores the compressed data in the memory 325B of the multifunctional interface 132B. The compression and decompression computing unit 321B decompresses the compressed data to generate the uncompressed data, and stores the uncompressed data in the memory 325B. The DMA controller 324B outputs the uncompressed data to the address in the cache area 213 of the memory 131A specified in the command.

In step S259, the multifunctional interface 132B outputs, by the DMA controller 324B, a response (indicating success or failure) to the command to the control data area 211 of the memory 131B. A notification may be issued to the CPU 130B by using an interrupt or the like before the response is outputted. In step S260, the CPU 130B reads the response from the control data area 211 of the memory 131B and confirms the command execution result.

In step S261, the CPU 130B writes a message having a content that the transfer of the decompressed data by the multifunctional interface 132B is completed to the control data area 211 of the memory 131A of the controller 120A and notifies the message. In step S262, the CPU 130A of the controller 120A performs polling to receive the message in the memory 131.

Second Embodiment

Hereinafter, another embodiment of the present specification will be described. In the following, differences from the first embodiment will be mainly described. In this embodiment, in the cross read operation, the multifunctional interface that executes the decompression process is selected based on a load of the controller. This can improve the performance in the cross read operation.

Figure 15:
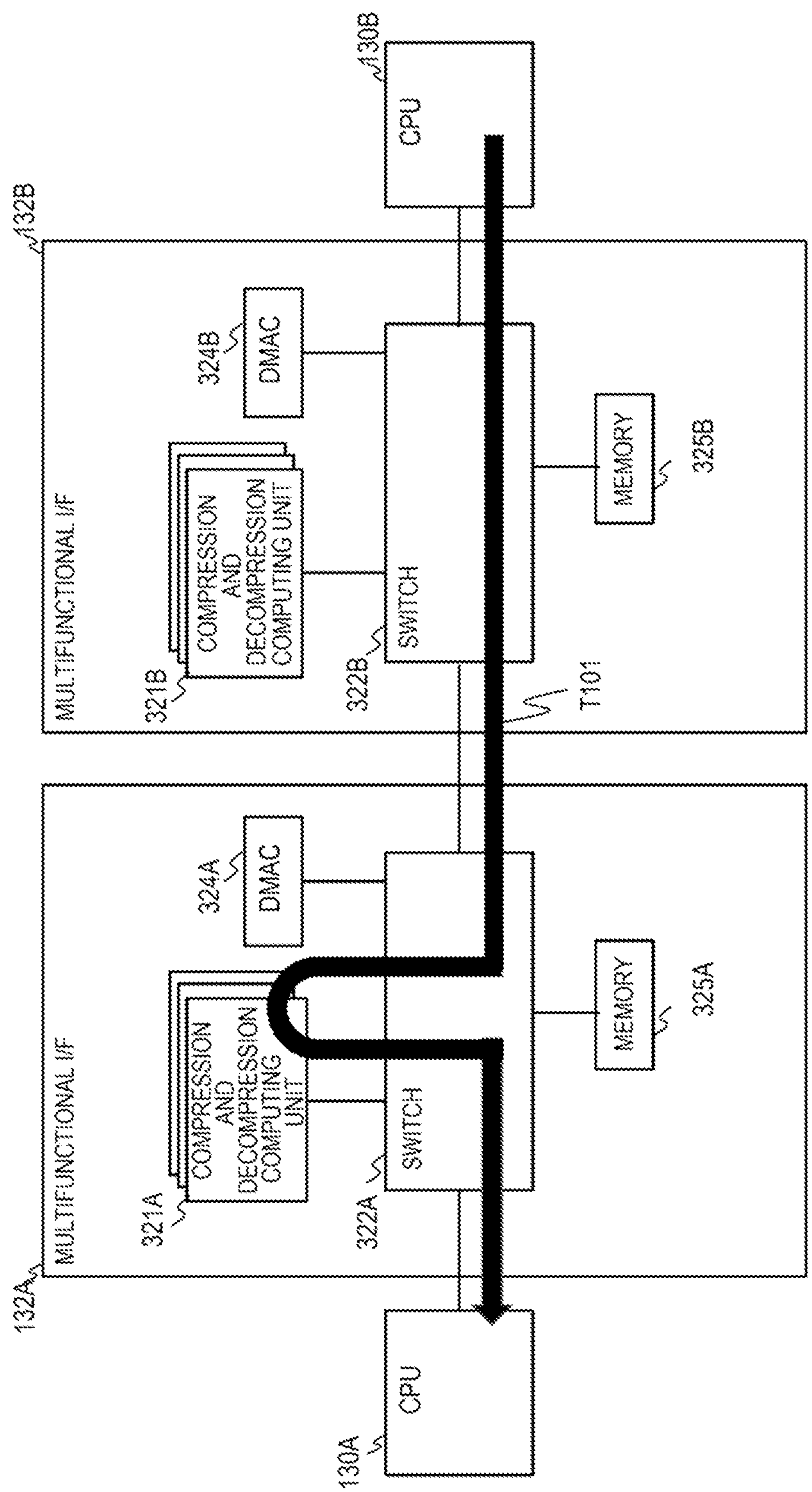
FIG. 15 illustrates a data flow when a selected multifunctional interface decompresses compressed data in a cross read operation according to a second embodiment.

FIG. 15 illustrates a data flow when the multifunctional interface 132A decompresses compressed data in the cross read operation. As described above, the multifunctional interface for executing the decompression process is selected from the two multifunctional interfaces 132A and 132B. When the multifunctional interface 132B is selected, the multifunctional interface 132B decompresses the compressed data.

Figure 16:
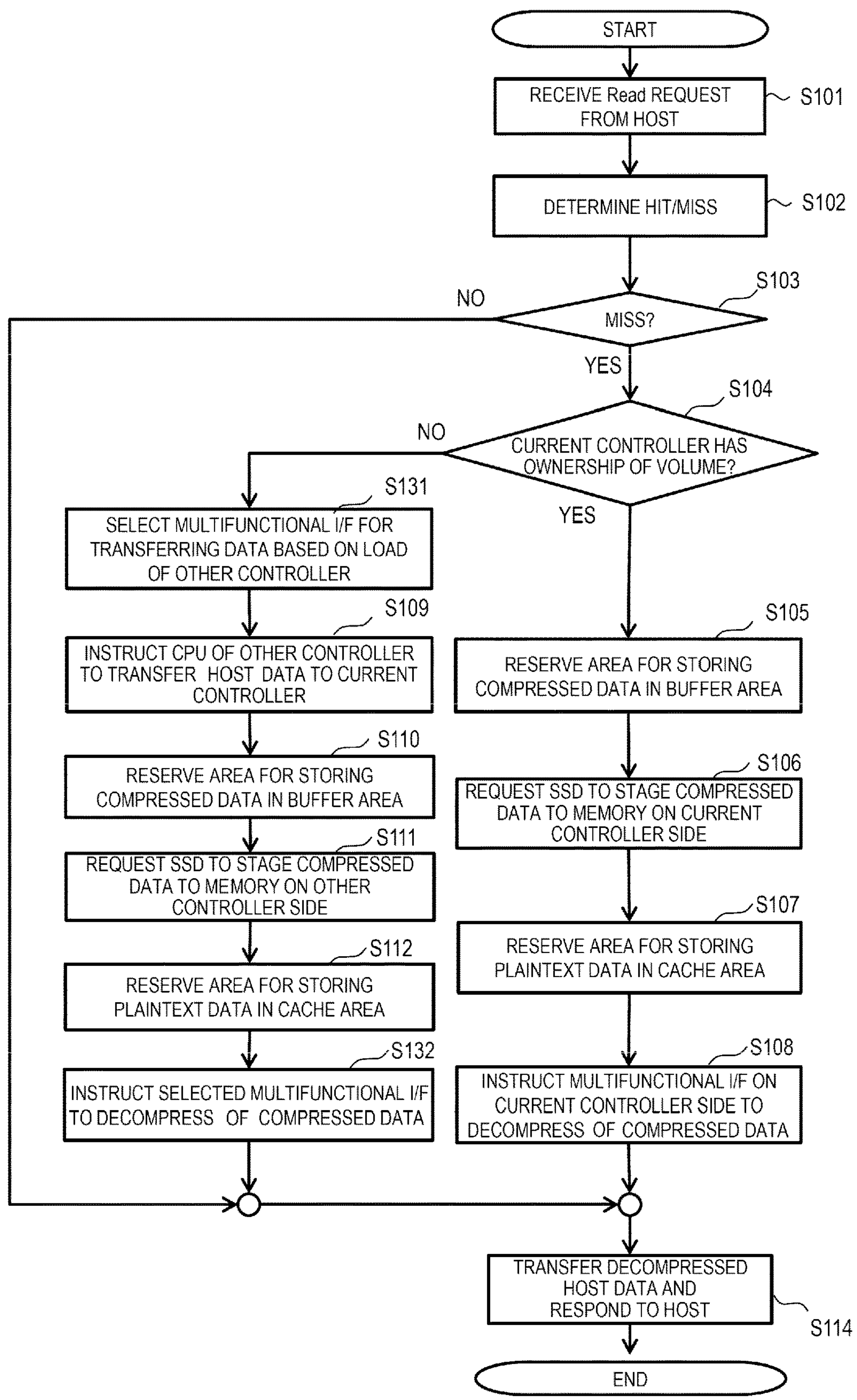
FIG. 16 is a flowchart illustrating an example of an operation of reading the storage system in response to a read request from a host.

FIG. 16 is a flowchart illustrating an example of the operation of reading the storage system 100 in response to the read request from the host 104. Compared to the flowchart illustrated in FIG. 12, step S131 is inserted before step S109. Step S132 is executed instead of step S113.

In step S131, the CPU 130A selects the multifunctional interface that decompresses the compressed data stored in the memory 131B and transfers the decompressed uncompressed data to the memory 131A, based on the load of the CPU 130B. Details of step S131 will be described later with reference to FIG. 17.

In step S132, the CPU 130B specifies the storage address of the compressed data and the storage address of the decompressed data with respect to the multifunctional interface selected in step S131, and instructs the selected multifunctional interface to decompress the compressed data. Specifically, the address of the buffer area 212 of the memory 131B where the compressed data is stored and the address of the cache area 213 of the memory 131A where the decompressed data is to be stored are specified. The multifunctional interface receives the instruction, and then reads the compressed data from the memory 131B, generates the uncompressed data by decompression, and transfers the compressed data to the memory 131A.

FIG. 17 is a flowchart illustrating details of step S131 in the flowchart of FIG. 16. First, the controller 120A requests the controller 120B to transmit load information (S151). The controller 120B acquires the load information and responds to the controller 120A (S152). The controller 120B can read load information of the CPUs from CPU registers and load information of the compression and decompression computing units from compression and decompression computing unit registers. The CPUs 130A and 130B, as well as the compression and decompression computing units 321A and 321B, monitor the load of the current device and store the information in the registers.

Next, the controller 120A receives the load information of the controller 120B from the controller 120B (S153). In one example, the load information of the CPU 130B and the compression and decompression computing unit 321B is acquired.

The controller 120A determines whether an operating rate of the compression and decompression computing unit 321B of the controller 120B exceeds a preset threshold value (S154). When the operating rate of the compression and decompression computing unit 321B exceeds the threshold value (S154: YES), the controller 120A determines to use the multifunctional interface 132A (S157).

When the operating rate of the compression and decompression computing unit 321B is equal to or less than the threshold value (S154: NO), the controller 120A determines whether the operating rate of the CPU 130B of the controller 120B exceeds a preset threshold value (S155). When the operating rate of the CPU 130B exceeds the threshold value (S155: YES), the controller 120A determines to use the multifunctional interface 132A (S157).

When the operating rate of the CPU 130B is equal to or lower than the threshold value (S155: NO), the controller 120A determines whether a PCIe flow rate in the CPU 130B exceeds a preset threshold value (S156). The information is acquired from the register of the CPU 130B. When the PCIe flow rate in the CPU 130B exceeds the threshold value (S156: YES), the controller 120A determines to use the multifunctional interface 132A (S157).

When the PCIe flow rate in the CPU 130B is equal to or less than the threshold value (S156: NO), the controller 120A determines to use the multifunctional interface 132B (S158). By the above-described process, a processing load for the read request from the host 104 can be distributed more appropriately and dynamically.

Figure 18:
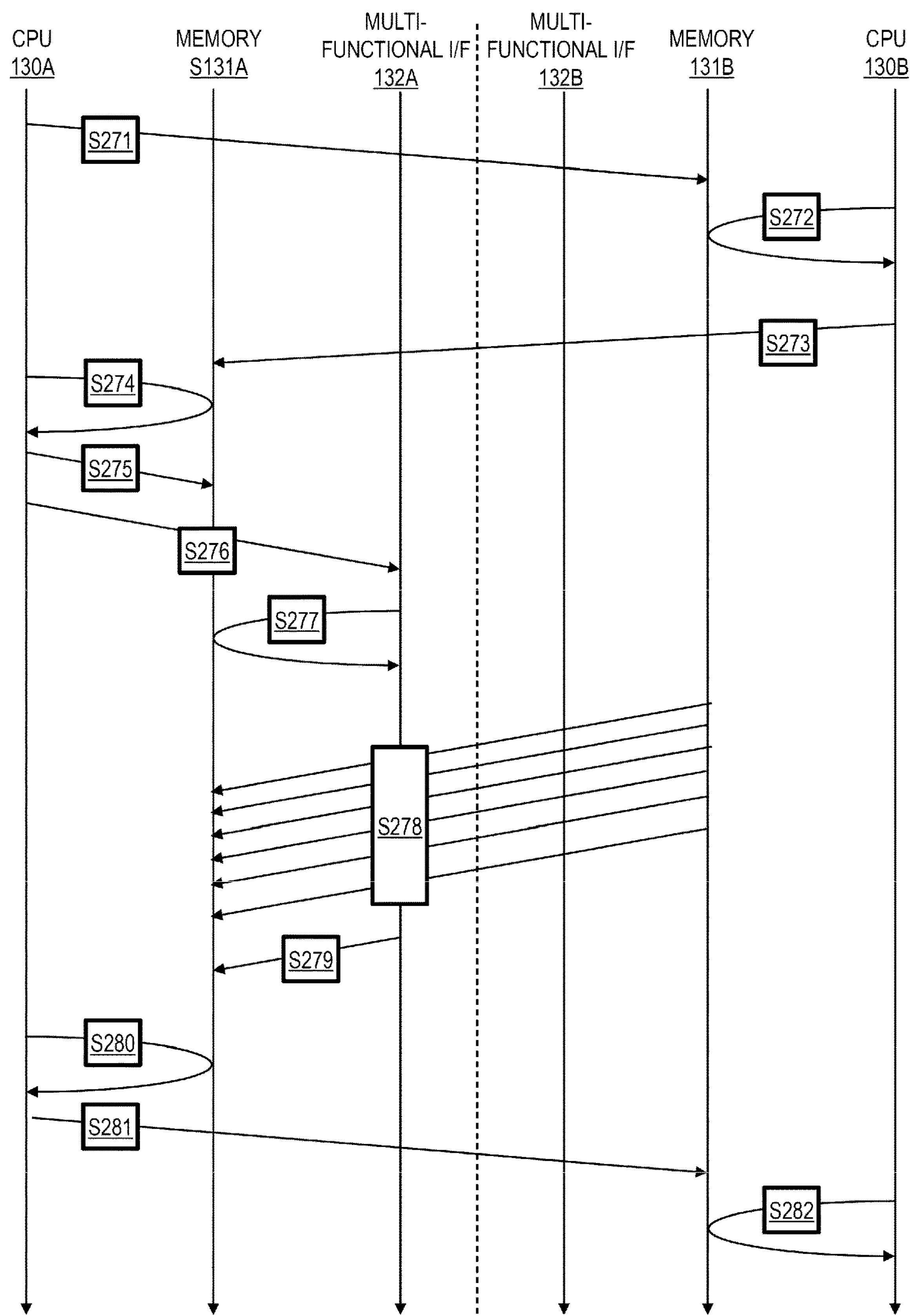
FIG. 18 is a sequence diagram illustrating details of processes in step S132 when a multifunctional interface on a current controller side is selected in step S131 of the flowchart of FIG. 16.

FIG. 18 is a sequence diagram illustrating details of processes in step S132 when the multifunctional interface 132A is selected in step S131 of the flowchart of FIG. 16. In the following description, the multifunctional interface 132A decompresses the compressed data.

In step S271, the CPU 130A of the controller 120A writes a message to the memory 131B of the controller 120B and requests the CPU 130B to notify a transfer destination address of pre-decompression data.

In step S272, the CPU 130B of the controller 120B performs polling to receive the message in the memory 131B. In step S273, the CPU 130B writes a message to the memory 131A of the controller 120A to notify a storage destination address of the data before decompression.

In step S274, the CPU 130A of the controller 120A performs polling to receive the message in the memory 131A. In step S275, the CPU 130A creates a command in the memory 131A to instruct the processing of the compression and decompression computing unit 321A of the multifunctional interface 132A.

In step S276, the CPU 130A operates the register of the multifunctional interface 132A to instruct to read the command created in the memory 131A. Specifically, the CPU 130A stores the memory address where the command is stored and the number of commands to be executed in the register of the multifunctional interface 132A, and kicks the register. In step S277, the multifunctional interface 132A receives the instruction and then reads the command in the memory 131A.

In step S278, the multifunctional interface 132A reads the pre-decompression data from the memory 131B of the controller 120B and outputs the decompressed data to the memory 131A of the controller 120A according to the command.

In step S279, the multifunctional interface 132A outputs a processing result (success or failure) to the memory 131A of the controller 120A. A notification may be issued to the CPU by using an interrupt or the like before the processing result is outputted to the memory 131A.

In step S280, the CPU 130A of the controller 120A reads the outputted result in the memory 131A and confirms the command execution result. In step S281, the CPU 130A writes a message having the content that the transfer of the pre-decompression data by the multifunctional interface 132A is completed to the memory 131B of the controller 120B to notify the memory 131B. In step S282, the CPU 130B of the controller 120B performs polling to receive the message in the memory 131B.

Alternatively, when the multifunctional interface 132B executes the decompression process of the compressed data, as described with reference to FIG. 14, the CPU 130B of the controller 120B instructs the multifunctional interface 132B to decompress the compressed data. The instruction specifies the storage address of the compressed data and the output destination address of the decompressed data. The determination of the load may be executed for the compression and decompression computing unit or for the CPU alone.

The invention is not limited to the above embodiments, and includes various modifications. For example, the embodiments described above have been described in detail for easy understanding of the invention, and the invention is not necessarily limited to those including all the configurations described above. A part of the configurations of the embodiments may be deleted and may be added or replaced with another configuration.

The invention may be realized with hardware, such as designing with an integrated circuit. Further, the invention can also be implemented by program codes of software that implements the functions of the embodiment. In this case, a storage medium recording the program codes is configured on a computer, and a processor included in the computer reads out the program codes stored in the storage medium. In this case, the program code read out from the storage medium implements the functions of the above-mentioned embodiment, and the program code and the storage medium storing the program codes constitute the invention. The storage medium for supplying the program code includes, such as, a flexible disk, a CD-ROM, a DVD-ROM, a hard disk, a solid state drive (SSD), an optical disk, a magneto-optical disk, a CD-R, a magnetic tape, a nonvolatile memory card, and a ROM.

Further, the program code for achieving the functions described in the present embodiment can be implemented in a wide range of programs or script languages such as assembler, C/C++, Perl, Shell, PHP, Python and Java (registered trademark). Further, the program code of the software that achieves the functions of the embodiments may be delivered via a network so as to be stored in a storage unit such as a hard disk or a memory of a computer or a storage medium such as a CD-RW or a CD-R, and a processor included in the computer may read out and execute the program code stored in the storage unit or the storage medium.

In the embodiments described above, control lines and information lines are considered to be necessary for description, and all control lines and information lines are not necessarily illustrated in the product. All configurations may be connected to each other.

What is claimed is:

1. A storage system, comprising:

a first controller including a first computing device, a first interface circuit and a first memory;

a second controller including a second computing device, a second interface circuit and a second memory, the second interface circuit including a compression and decompression computing unit and configured to transfer data between the first controller and the second controller; and one or more storage drives configured to store data, wherein the first controller is configured to:

receive a first read request for first uncompressed data from a host; and send an instruction to the second controller, which has ownership of the first uncompressed data for the first read request, to store the first uncompressed data in the first memory, wherein the second controller is configured to:

receive the instruction from the first controller;

instruct the one or more storage drives to transfer first compressed data, which is compressed data for the first read request, to the second memory from the one or more storage drives; and instruct the second interface circuit based on the ownership to:

read the first compressed data from the second memory;

decompress the first compressed data in the second memory with the compression and decompression computing unit to generate the first uncompressed data; and write the first uncompressed data into the first memory and a third memory of a third controller, and wherein the first controller is configured to transfer the first uncompressed data in the first memory to the host.

2. The storage system according to claim 1, wherein the first uncompressed data is transferred from the second interface circuit to the first memory via the first interface circuit.

3. The storage system according to claim 1, wherein the first compressed data is to be stored in a buffer area of the second memory, and the first uncompressed data is to be stored in a cache area of the first memory.

4. The storage system according to claim 2, wherein the first controller is configured to receive a second read request for second uncompressed data from the host, the first controller is configured to store second compressed data of the second uncompressed data in the first memory, and the first interface circuit is configured to:

read the second compressed data from the first memory;

decompress the second compressed data to generate the second uncompressed data; and write the second uncompressed data into the first memory.

5. The storage system according to claim 2, wherein the second controller is configured to, according to the first read request from the first controller, specify a storage address of the first compressed data and a storage address of the first uncompressed data with respect to the second interface circuit, and instruct the second interface circuit to decompress the first compressed data.

6. The storage system according to claim 1, wherein the first controller is configured to:

acquire a third read request for third uncompressed data; and determine the first interface circuit or the second interface circuit as the interface circuit for decompressing third compressed data, which is compressed data for the third read request, based on a load of at least one of the second computing device or the second interface circuit.

7. The storage system according to claim 6, wherein the first controller is configured to determine the interface circuit for decompressing the third compressed data based on the loads of both the second computing device and the second interface circuit.

8. A control method for a storage system, the storage system including: a first controller including a first computing device, a first interface circuit and a first memory; a second controller including a second computing device, a second interface circuit and a second memory, the second interface circuit including a compression and decompression computing unit and configured to transfer data between the first controller and the second controller, and one or more storage drives configured to store data, the control method comprising the steps of:

by the first controller:

receiving a read request from a host; and sending an instruction to the second controller, which has ownership of data for the read request, to store first uncompressed data, which is uncompressed data for the read request, in the first memory, by the second controller:

receiving the instruction from the first controller;

instructing the one or more storage drives to transfer first compressed data, which is compressed data for the read request, to the second memory from the one or more storage drives; and instructing the second interface circuit based on the ownership to:

read the first compressed data from the second memory;

decompress the first compressed data in the second memory with the compression and decompression computing unit to generate the first uncompressed data; and write the first uncompressed data into the first memory and a third memory of a third controller, wherein the first controller is configured to transfer the first uncompressed data in the first memory to the host.

* * * * *